United States Patent
Yoneyama et al.

(10) Patent No.: US 10,905,960 B2
(45) Date of Patent: Feb. 2, 2021

(54) GAME SYSTEM, TERMINAL DEVICE AND PROGRAM

(71) Applicant: Konami Digital Entertainment Co., Ltd., Tokyo (JP)

(72) Inventors: Minoru Yoneyama, Tokyo (JP); Kensuke Kokami, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 0 days.

(21) Appl. No.: 16/244,565

(22) Filed: Jan. 10, 2019

(65) Prior Publication Data

US 2019/0143217 A1    May 16, 2019

Related U.S. Application Data

(63) Continuation of application No. PCT/JP2017/014728, filed on Apr. 10, 2017.

(30) Foreign Application Priority Data

Jul. 14, 2016    (JP) ................. 2016-139804

(51) Int. Cl.
*A63F 13/52*    (2014.01)
*A63F 13/45*    (2014.01)
(Continued)

(52) U.S. Cl.
CPC .............. *A63F 13/67* (2014.09); *A63F 13/45* (2014.09); *A63F 13/47* (2014.09); *A63F 13/52* (2014.09);
(Continued)

(58) Field of Classification Search
None
See application file for complete search history.

(56) References Cited

U.S. PATENT DOCUMENTS

2014/0128154 A1*  5/2014  Asano ................. A63F 13/30
                                                    463/29
2014/0235352 A1*  8/2014  Ikeda ................. A63F 13/12
                                                    463/42

FOREIGN PATENT DOCUMENTS

JP    2001-340643 A    12/2001
JP    2005-204755 A    8/2005
(Continued)

OTHER PUBLICATIONS

How to play "BOX Gatsha."—On-the-spot powerful professional baseball.(iOS/Android)The capture Wiki, Wayback Machine [online], Dec. 5, 2015, [Feb. 15, 2019 search], 3 pages total.
(Continued)

*Primary Examiner* — James S. McClellan
*Assistant Examiner* — Peter J Iannuzzi
(74) *Attorney, Agent, or Firm* — Sughrue Mion, PLLC

(57) ABSTRACT

An in-terminal display device causes at least one first icon to appear and displays the at least one first icon in at least one of a plurality of areas. An in-terminal input device receives an operation of switching areas and an operation of selecting a first icon. An in-terminal controller or an in-server controller controls a game corresponding to a selected first icon such that the game can be played when any one of first icons is selected in a switched area. The in-terminal controller of the in-server controller limits the number of first icons to be caused to appear to an upper limit value or less.

19 Claims, 22 Drawing Sheets

(51) Int. Cl.
| A63F 13/47 | (2014.01) |
| G06F 3/0481 | (2013.01) |
| A63F 13/533 | (2014.01) |
| A63F 13/69 | (2014.01) |
| A63F 13/822 | (2014.01) |
| A63F 13/67 | (2014.01) |
| A63F 13/58 | (2014.01) |

(52) U.S. Cl.
CPC .......... *A63F 13/58* (2014.09); *G06F 3/04817* (2013.01); *A63F 13/533* (2014.09); *A63F 13/69* (2014.09); *A63F 13/822* (2014.09); *A63F 2300/6027* (2013.01); *A63F 2300/632* (2013.01)

(56) References Cited

FOREIGN PATENT DOCUMENTS

| JP | 2006-239171 A | 9/2006 |
| JP | 2013-247977 A | 12/2013 |
| JP | 2014-083209 A | 5/2014 |
| JP | 2014-90974 A | 5/2014 |

OTHER PUBLICATIONS

The 1st time of a shadow verth, Part1: what should be done for playing a shadow verth? A shadow verth official site [online], Jun. 16, 2016, [Feb. 15, 2019 search], 12 pages total.

Notification of Reasons for Refusal dated Mar. 5, 2019 issued by the Japanese Patent Office in counterpart application No. 2017-094307.

Things I would like to remember before putting in the whole world 10million DL of entertainment RPG , "kronosblade", Famitsu App [online] Jun. 30, 2016, [search on May 23, 2019] (16 pages total).

Fantasy Star Online 2, Electric shock PlayStation, ASCII Media Works, vol. 541, , vol. 19, No. 15, Apr. 25, 2013, 628th issue, pp. 94-99 (9 pages total).

"Fantasy Star Online 2," 4th Anniversary Update part1, with triggers that can trigger emergency quest as well as SG consumption centent etc, implemented, Famitsu. com [online] Jun. 15, 2016,. [search on May 23, 2019] (11 pages total).

Communication dated Jun. 4 , 2019, from the Japanese Patent Office in application No. 2018-123720.

Magnus Memoria, Monthly Applistyle, Jul. 2015, Applistyle Inc., vol. 2, May 28, 2015, No. 7, pp. 013-018 (9 pages total).

Mevius Final Fantasy, Shuukan Famitsu No. 1383, Kadokawa•Dwango Corporation, Jun. 4, 2015, vol. 30, No. 25 1383th issue, pp. 110-115 (9 pages total).

Communication dated Jan. 23, 2019, from Japanese Patent Office in counterpart application No. 2017-094306.

International Search Report of PCT/JP2017/014728 dated Jun. 27, 2017.

Written Opinion of PCT/JP2017/014728 dated Jun. 27, 2017.

[Puyokue Tettei Koryaku] Dai 7 Kai: Yosei dake janai! Card no Nyushu no Hoho! [Shoshinsha Hikken], [online], Jun. 26, 2013 (Jun. 26, 2013), octoba, [retrieval date Jun. 26, 2013 (Jun. 26, 2013)], Internet<URL:https://octoba.net/archives/20130626-android-feature-puyo7.html>.

Wonder Tactics [Game Review], [online], Jan. 22, 2016 (Jan. 22, 2016), GameDeets, [retrieval date Jun. 16, 2017 (Jun. 16, 2017)], Internet<URL:https://gamedeets.com/archives/54333>.

IOS/Android 'Brave SwordxBlaze Soul' ver.1.2.1 Appude ga Jisshi! Yori Tsukaiyasuku natta Kino o Shokai, [online], Mar. 18, 2016 (Mar. 18, 2016), Gamer, [retrieval date Jun. 16, 2017 Jun. 16, 2017)], InternetCURL:http://www.gamer.ne.jp/news/20160318-0129/>.

[RUN Game Tokushu] Kantan Sosa de Sokai ni Kakenukero! Running Game Tokushu, [online], Aug. 12, 2015 (Aug. 12, 2015), Boom App Games, [retrieval date Jun. 16, 2017 (Jun. 16, 2017)], InternetCURL:https://game.boom-app.com/entry/special-run-01>.

"Realize Symbol Encounter System", Jason 3 Blog [online], Jun. 6, 2012, URL: https://1m-tat.webry.info/201206/article_1.html> (15 pages total).

Gundam Card Collection, the amount of money spent on gacha is clearly specified: see social games 12, GameCast [online], Jun. 10, 2012, URL: http: // www.gamecast-blog.com/archives/65683438.html> (7 pages total).

Communication dated Oct. 1, 2019, from the Japanese Patent Office in counterpart application No. 2018-123720.

Communication dated Nov. 12, 2019, from the Japanese Patent Office in counterpart application No. 2017-094307.

Communication dated Jul. 7, 2020, from the Japanese Patent Office in Application No. 2017-094307.

* cited by examiner

FIG. 36

| CARD ID | CARD NAME | CARD TYPE | LEVEL | OFFENSE POWER | DEFENSE POWER | CARD TEXT | EFFECT | VERSION | IMAGE |
|---|---|---|---|---|---|---|---|---|---|
| aaaaaa | MONSTER A | MONSTER | 8 | 5000 | 3000 | OOOO... | NO | 3 | aaaaaa.jpg |
| bbbbbb | MONSTER B | MONSTER | 4 | 2000 | 100 | OOOO... | EFFECT P | 4 | bbbbbb.jpg |
| cccccc | MAGIC C | MAGIC | - | - | - | OOOO... | EFFECT X | 4 | cccccc.jpg |

FIG. 37

| FRAME ID | CARD ID |
|---|---|
| MAIN 01 | aaaaa |
| MAIN 02 | ccccc |
| ... | ... |
| SIDE 01 | ttttttt |
| SIDE 02 | ttttttt |
| ... | ... |

FIG. 38

| USER ID | 000000001 |
|---|---|
| PLAYER LEVEL | 35 |
| MONEY IN GAME A | 50000 MONEY |
| MONEY IN GAME B | 1500 |
| MONTHLY CHARGING AMOUNT | 3000JPY |
| AGE AUTHENTICATION | 18 OR MORE |

FIG. 39

| QUEST TYPE | APPEARANCE INTERVAL | APPEARANCE PROBABILITY | APPEARANCE OBJECT |
|---|---|---|---|
| NORMAL | ONCE PER 3 MINUTES | 100% | DRAWING FROM NORMAL QUESTS 1 TO 9 |
| RARE | ONCE PER 5 MINUTES | 70% | DRAWING FROM RARE QUESTS 10 TO 15 |

GAME SYSTEM, TERMINAL DEVICE AND PROGRAM

TECHNICAL FIELD

The present invention relates to a game system, a terminal device and a program.

BACKGROUND ART

Conventionally, game devices by which users can play games in exchange for points restored with the elapse of time are known (for example, Patent Literature 1).

CITATION LIST

Patent Literature

[Patent Literature 1]
Japanese Unexamined Patent Application, First Publication No. 2014-83209

SUMMARY OF INVENTION

Technical Problem

The aforementioned games cannot be played until points are restored. Accordingly, a specification of restoring points with the elapse of time has become a reason why a user does not want to play a game. Therefore, there is a need for a new element as a game element by which games can be played in exchange for points restored with the elapse of time or in addition to such points.

An object of several aspects of the present invention is to provide a terminal device and a program capable of providing a new game element.

Solution to Problem

One aspect of the present invention is a game system including a display device which causes at least one first icon to appear and displays the at least one first icon in at least one of a plurality of areas, an input device which receives an operation of switching the areas and an operation of selecting a first icon, and a controller which controls a game corresponding to a selected first icon such that the game can be played when any one of the first icons is selected in a switched area, wherein the controller limits the number of first icons to be caused to appear to an upper limit value or less.

In addition, one aspect of the present invention is a program for causing a computer to function as the game system.

BRIEF DESCRIPTION OF DRAWINGS

FIG. 36 is a diagram showing an example of card data according to an embodiment.
FIG. 37 is a diagram showing an example of deck data according to an embodiment.
FIG. 38 is a diagram showing an example of user data according to an embodiment.

FIG. 39 is a diagram showing an example of appearance rule data according to an embodiment.

DESCRIPTION OF EMBODIMENTS

Figure 1:
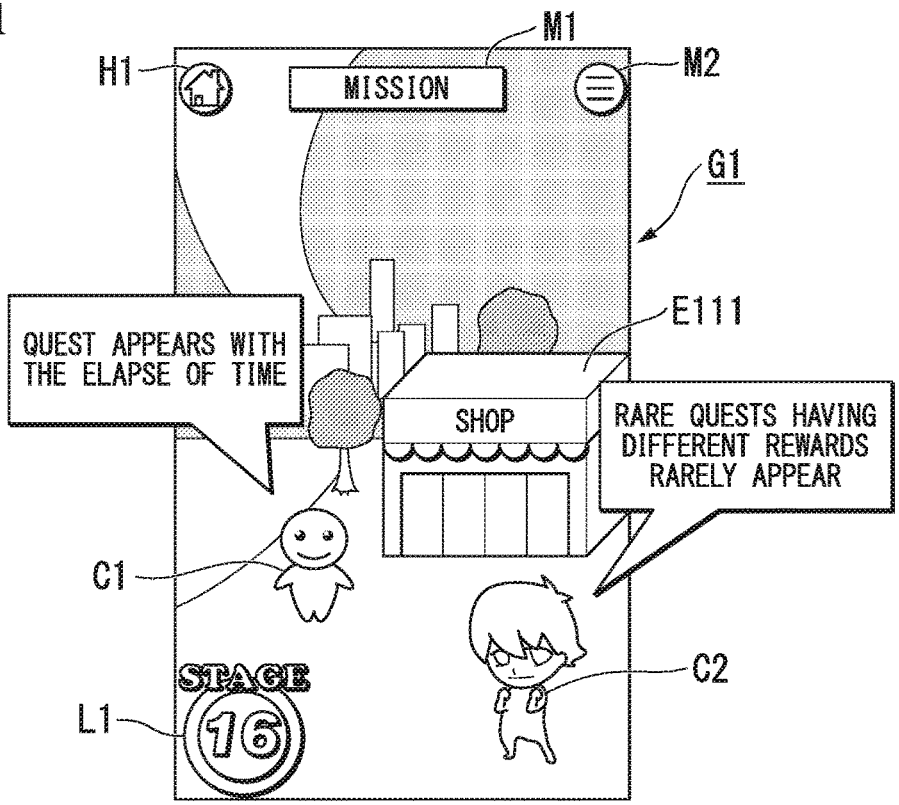
FIG. 1 is a first diagram showing the overview of an embodiment of the present invention.

Hereinafter, an embodiment of the present invention will be described with reference to the drawings.

First Embodiment

[Overview of First Embodiment]

A first embodiment of the present invention will be described.

A game system 1 (FIG. 5) according to the present embodiment is an information processing system that provides games.

A game according to the present embodiment is a so-called video game that is a game processed by a computer. Such a game has a concept called a quest. A purpose of a player is to achieve various quests provided by a game.

Play (to play) is an operation of a user progressing through a game by inputting operations (hereinafter, referred to as a "game operation") for progressing through the game. In the following, inputting game operations in order to achieve a quest may be referred to as "quest play (plays a quest)". In addition, a user will be described as a player who plays a game unless otherwise mentioned in the following.

A quest is one or more game targets. A game target is associated with one or more target achievement conditions. With respect to a part or all of game targets constituting a quest, satisfying target achievement conditions may be referred to as "achievement of the quest (the quest is achieved)" in the present embodiment. Further, a game target is associated with one or more game parts. That is, target achievement conditions pertaining to one or more game parts are associated with one quest. In this case, playing a quest is playing a game part of a game target included in the quest. Hereinafter, a case in which a quest is a predetermined number of battles in a battle part will be described as an example.

A quest may end when at least a part of target achievement conditions constituting the quest is satisfied or when predetermined quest end conditions are satisfied. Quest end conditions may include temporal, spatial and numerical conditions. For example, a temporal condition may be the elapse of a predetermined time from start of a quest. For example, a spatial condition may be movement of a player character to a predetermined place. For example, a numerical condition may be a condition in which a numerical value of a predetermined parameter of a player character, such as life points which will be described later, reach a predetermined value. A quest is associated with a reward, and the game system 1 gives a reward to a user when a quest is achieved. That is, a quest is a device of sections of a game for giving a reward.

Rewards may be different according to types or details of target achievement conditions. That is, rewards may be different according to opponent types set in quests, difficulty levels of quests, and the like. A difficulty level of a quest is an index of difficulty (severity) in satisfying target achievement conditions set in the quest. For example, when a target achievement condition is winning a battle, a difficulty level of a quest may correspond to the strength of an opponent. The strength of an opponent varies according to a parameter value indicating the capability of the opponent in a battle, parameter values of cards used by the opponent in the battle, operation accuracy (e.g., learning intensity of artificial intelligence) of a program that controls the opponent, etc., for example. In addition, when a target achievement condition is acquiring a predetermined amount of in-game money, for example, a difficulty level of a quest may correspond to the amount of money in the game. Further, when a time limit is set as a target achievement condition, for example, a difficulty level of a quest may correspond to the duration of the time limit.

A game is composed of a plurality of game parts such as battles with characters operated by other players, battles with characters controlled by computers, purchase of items, use of items, and confirmation of possessed (owned) items. In the following, all games coded according to one game control program executed by the game system 1 are referred to as "primary games" and game parts included in primary games are referred to as "secondary games" for convenience of description. That is, a primary game includes one or more secondary games. Further, a primary game and a secondary game are simply referred to as a "game" when they are not particularly distinguished from each other.

In the present embodiment, a case in which a battle part is included as a game part will be described as an example. In this battle part, a user can battle with characters operated by other users or characters controlled by computers using a deck that is a deck of cards, for example. Details of the battle part will be described later.

A card is an example of a game object used in a secondary game.

A game object is a conceptual device in a game. In addition, a game object is a device on a visible display, for example. Further, a game object is a device selectable by a user, for example. Further, a game object is a division of data such as a numerical value, text, an image and a sound used in a game, for example. That is, a game object represents a conceptual division in games.

FIG. 1 to FIG. 4 are diagrams showing the overview of the present embodiment.

A game screen G1 shown in FIG. 1 represents an example of a world screen. The world screen will be described later.

In the example shown in FIG. 1, quest selection icons C1 and C2 are disposed on the world screen G1.

A quest selection icon is an operator by which a quest is started. One quest selection icon is associated with one or more quests. Here, a case in which one quest selection icon is associated with one quest is described as an example. A user can select a quest selection icon to play a quest corresponding to the selected icon.

Here, there is a plurality of types of quest. Hereinafter, a case in which there are normal quest and rare quest types will be described as an example. A normal quest and a rare quest have different details of a reward, reward selection methods, quest difficulty levels and the like, for example. A rare quest has a relatively high quest difficulty level and is set such that a relatively good reward is easily obtained compared to normal quests, for example. A relatively good reward is a relatively large amounts of game objects, a game object having a relatively high parameter value indicating a value set therein, a game object having a relatively high parameter value indicating a novelty (version) set therein, or the like, for example.

In the example shown in FIG. 1, the quest selection icon C1 is a quest selection icon corresponding to a normal quest. The quest selection icon C2 is a quest selection icon corresponding to a rare quest. Patterns and display forms (e.g., colors, sizes, shapes and additional information) of quest selection icons may be different according to types, details and the like of quests. For example, quest selection icons with respect to normal quests may have the same pattern and quest selection icons with respect to rare quests may have patterns of human forms that individually represent opponents of quests.

In the present embodiment, the game system 1 controls an appearance of quest selection icons on the basis of a predetermined appearance rule. This appearance rule is to cause an icon to newly appear with the elapse of time. Newly appearing (appear) is being newly disposed and displayed on a game screen. In the following, the appearance of a quest selection icon may be referred to as "appearance of a quest" for convenience.

Here, a specific example of the appearance rule is described.

First, the game system 1 determines whether a predetermined timing has arrived. For example, the predetermined timing may be a timing at which a predetermined time has elapsed from a previous appearance of a quest selection icon or play of a previous quest. In the following, a time interval at which the predetermined timing arrives may be referred to as an "appearance time interval." When the predetermined timing has arrived, the game system 1 causes one quest selection icon to appear at a predetermined probability (hereinafter, referred to as an "appearance probability"). That is, the game system 1 causes a quest selection icon to appear at a predetermined frequency. Here, the game system 1 determines whether the number of quest selection icons that are currently appearing has reached a predetermined upper limit value (hereinafter, referred to as an "appearance upper limit value") and does not cause a quest selection icon to newly appear when the number of quest selection icons that are currently appearing has reached the appearance upper limit value. The appearance time interval, the appearance probability and the appearance upper limit value are predetermined for each quest type. For example, a rare quest appearance frequency maybe set to be lower than a normal quest appearance frequency. The appearance time interval and the appearance probability may be fixed or may be variable.

A specific example of the appearance rule has been described above.

In this manner, the game system 1 according to the present embodiment causes quest selection icons to appear with the elapse of time. That is, the game system 1 causes the details of selectable quests not to be able to be easily ascertained until time elapses. Accordingly, the game system 1 can attract the interest and attention of a user with respect to quests which will be subsequently selectable.

In addition, the game system 1 sets the appearance upper limit value. In this case, it is necessary for a user to play quests such that the number of appearances of goes selection icons does not reach the appearance upper limit value in order to play as many quests as possible. In other words, the user can play a larger number of quests by managing time and considering a timing at which a quest is played. That is, the game system 1 can give strategic properties to quest selection by setting the appearance upper limit value and thus can attract a user's attention more strongly.

Further, the game system 1 sets different appearance frequencies for respective quest types. In this case, it is effective for a user to play quests from a quest having a high appearance frequency in order to play as many quests as possible. On the other hand, a quest having a low appearance frequency has a relatively high difficulty level and easily obtains a relatively good reward. Accordingly, it is effective for a user to play quests from a quest having a low appearance frequency and a high difficulty level in order to obtain as good rewards as possible. That is, the game system 1 can give strategic properties to quest selection by setting different appearance frequencies for quest types and thus can attract a user's attention more strongly.

Figure 2:
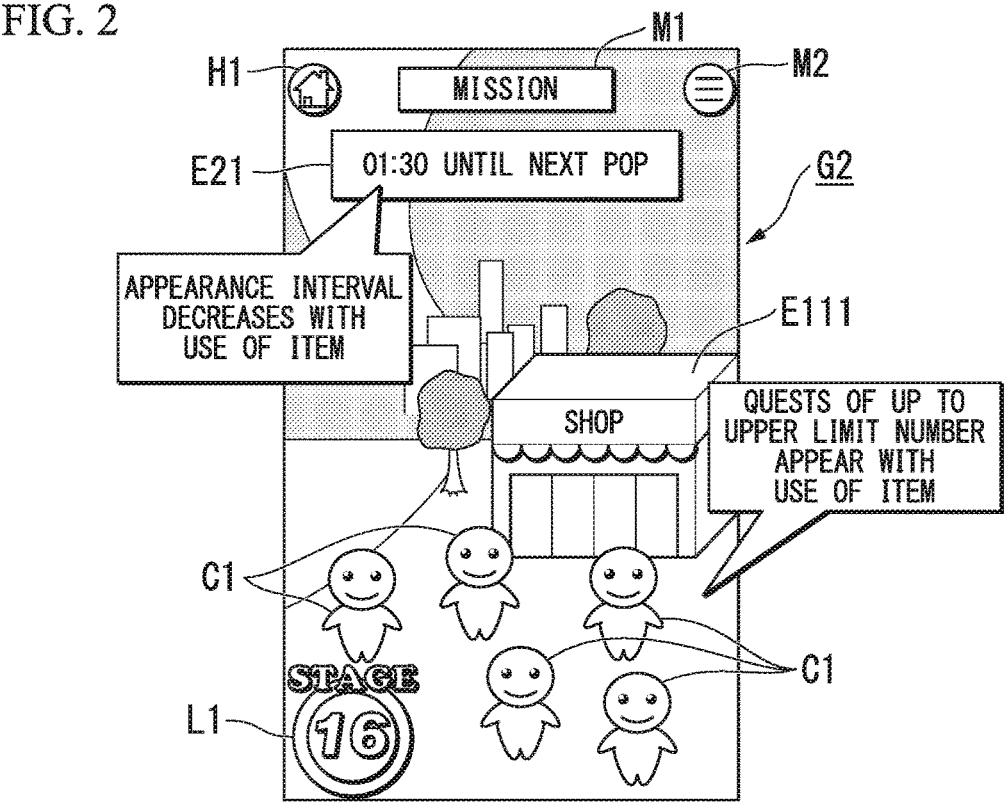
FIG. 2 is a second diagram showing the overview of the embodiment.

A game screen G2 shown in FIG. 2 represents another example of the world screen. A plurality of quest selection icons C1 is disposed on the world screen G2. In addition, a time display section E21 displays an appearance time of the next quest selection icon.

Here, the appearance rule for quest selection icons according to the present embodiment can be changed according to use of an item or in-game money. For example, the game system 1 may change an appearance time interval and an appearance probability of quest selection icons within a predetermined period according to use of an item or in-game money. In addition, the game system 1 may cause immediate appearance of a number of quest selection icons which is less than the appearance upper limit value, a number of quest selection icons which is equal to the appearance upper limit value or a predetermined number of quest selection icons according to use of an item or in-game money, for example. Furthermore, the game system 1 may cause a predetermined quest to be selectable according to use of an item or in-game money, for example. In addition, the game system 1 may allow a user to easily select a quest according to use of an item or in-game money, for example. Accordingly, the game system 1 can allow a user to easily select a desired quest.

An item is a game object that provides a predetermined effect for progression of a primary game and a secondary game by being used. That is, use of an item is to show a predetermined affect associated with the item. The effect of an item may be advantageous or disadvantageous for a user.

In-game money is a game object used for exchange with other game objects such as an item, a card, a deck, a player character and the like. Using in-game money is consuming in-game money in order to possess other game objects.

In the following, an example in which an item or in-game money is consumed by being used will be described. In this case, use of an item or in-game money may also be execution of a predetermined process according to consumption of the item or in-game money. However, items may not be consumed by being used.

Figure 3:
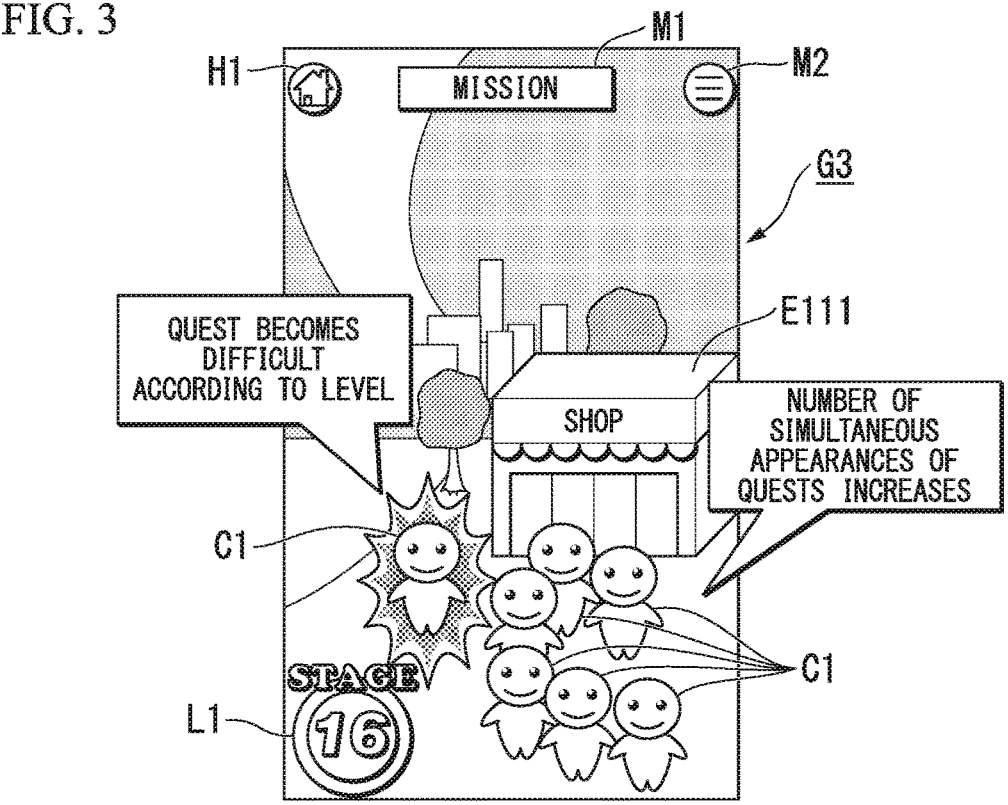
FIG. 3 is a third diagram showing the overview of the embodiment.

A game screen G3 shown in FIG. 3 represents another example of the world screen. A player level display section L1 is provided on the world screen G3.

The player level display section L1 is a section in which a player level is displayed. A player level is an example of an index indicating a game progress of a user, such as a game proficiency level of the user. In the example of the world screen G3, a player level is represented as a stage (STAGE). Meanwhile, the player level display section L1 may function as an operator for displaying a mission details screen G6 which will be described later.

Here, the game system 1 according to the present embodiment changes quests selectable by a user and the appearance rule for quest selection icons according to a player level. For example, the game system 1 may change the difficulty level or type of a quest corresponding to a quest selection icon according to a player level. In addition, the game system 1 may change the appearance upper limit value of quest selection icons according to a player level, for example. Further, the game system 1 may change an appearance frequency of a quest selection icon according to a player level, for example. In addition, the game system 1 may allow a user to more easily select a quest according to player level improvement, for example. In this case, the user more easily selects a desired quest by improving the player level. Accordingly, the game system 1 can motivate the user to continue a game.

Figure 4:
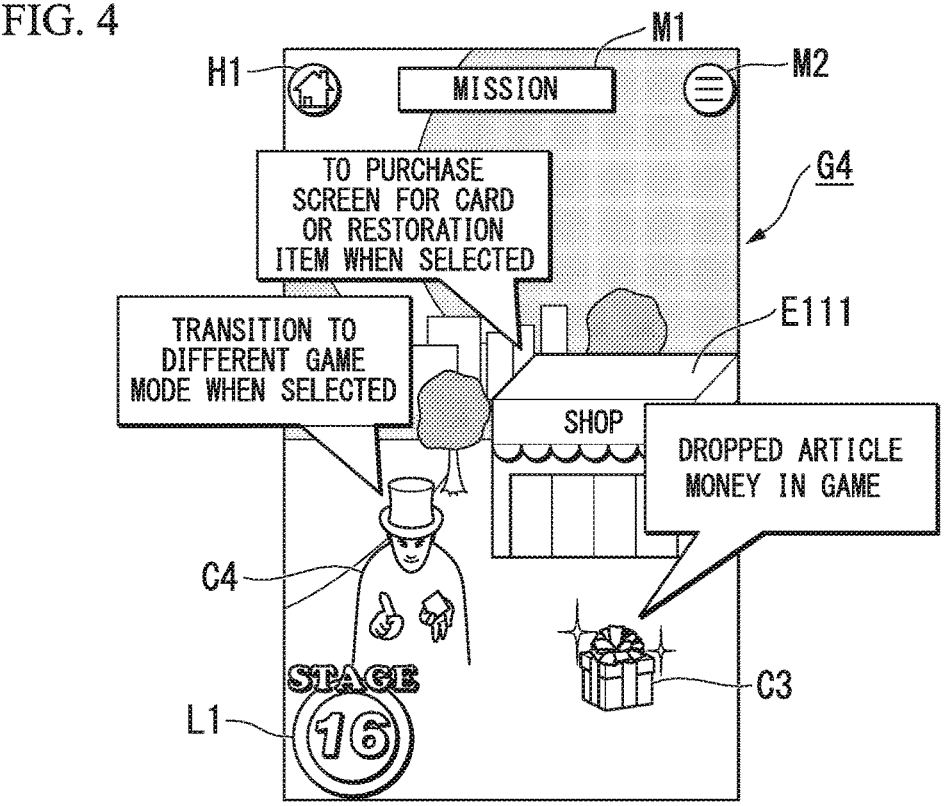
FIG. 4 is a fourth diagram showing the overview of the embodiment.

A game screen G4 shown in FIG. 4 represents another example of the world screen. A dropped article icon C3, a trader icon C4 and a shop icon E111 are disposed on the world screen G4.

A dropped article icon is an image representing a game object such as an item, in-game money or a card. When a user selects a dropped article icon, the game system 1 provides an item, in-game money, a card or the like corresponding to the selected dropped article icon to a user.

A trader icon is an image for starting a shop part according to selection.

A shop icon is an image for starting a shop pail according to selection.

A shop part is a game part that provides a function of allowing a user to be able to use a game object such as a card, a deck, a command or a player character in exchange for a predetermined price. That is, the user can purchase or exchange game objects in the shop part. The shop icon is always disposed at a specific position in a virtual space in a game, whereas the trader icon is not always so disposed. In addition, for the shop icon and the trader icon, different assortments of articles provided in shop functions corresponding thereto, different game objects consumed for prices at the time of purchase (exchange), and the like may be set.

Here, the game system 1 according to the present embodiment causes the dropped article icon to appear like a quest selection icon, as shown in the world screen G4. Then, a user can obtain an item, in-game money, a card or the like by selecting the dropped article icon and thus the user does not lose interest in the game even when a quest selection icon does not appear. That is, the game system 1 can motivate the user to continue the game.

In the following, the quest selection icon, the dropped article icon and the trader icon may be collectively referred to as an appearance control icon.

In addition, the game system 1 according to the present embodiment arranges an image for starting other functions such as a shop icon on a screen on which appearance control icons are disposed. That is, a user checks shop icons while searching appearance control icons. Accordingly, the game system 1 can guide the user to other game parts.

The overview of the present embodiment has been described above.

'Configuration of Game System 1'

Next, a configuration of the game system 1 will be described.

Figure 5:
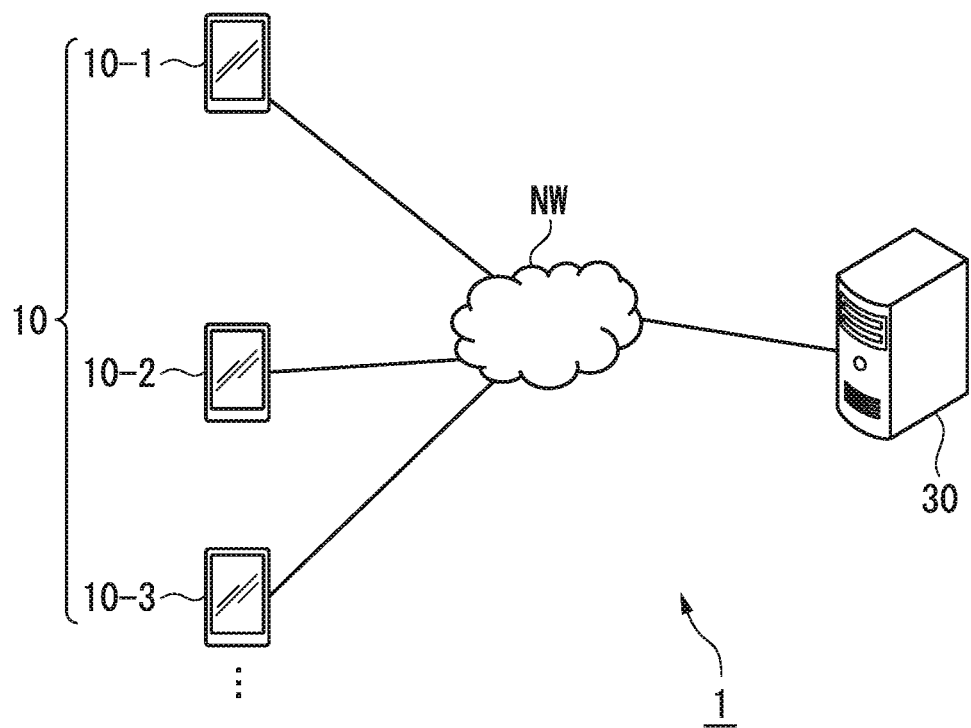
FIG. 5 is a diagram showing a configuration of a game system according to an embodiment.

FIG. 5 is a diagram showing a configuration of the game system 1.

The game system 1 includes a plurality of terminal devices 10-1, 10-2, 10-3, . . . and a server device 30. In the following, the plurality of terminal devices 10-1, 10-2, 10-3, . . . are collectively referred to as a terminal device 10 when they are not distinguished. The terminal device 10 and the server device 30 can be connected to a network NW such that they can communicate and transmit/receive information to/from each other.

The terminal device 10 is an electronic apparatus including a computer system. For example, the terminal device 10 may be a personal computer (PC), a tablet PC, a cellular phone such as a smartphone or a feature phone, a potable information terminal (personal digital assistance (PDA)), a portable game console, a non-portable game console or the like. A user plays primary games and secondary games using the terminal device 10.

The server device 30 is an electronic apparatus including a computer system.

The terminal device 10 and the server device 30 execute game control programs functioning as a pair. In the following, a game control program executed in the terminal device 10 is referred to as an "in-terminal game control program" and a game control program executed in the server device 30 is referred to as an "in-server game control program." In addition, if the in-terminal game control program and the in-server game control program are not distinguished from each other, they are simply referred to as a "game control program." For example, the server device 30 can transmit the in-terminal game control program to the terminal device 10.

All of data necessary to execute the in-terminal game control program and the in-server game control program may be stored in both or any one of the terminal device 10 and the server device 30 or a part thereof may be stored in the terminal device 10 and the server device 30. In addition, all or a part of data necessary to execute a game control program may be stored in other server devices. In the following, a case in which principle parts of data necessary to execute a game control program are stored in the server device 30 will be described as an example.

The configuration of the game system 1 has been described above.

[Configuration of Computer System]

Next, a computer system 90 included in the terminal device 10 and the server device 30 will be described.

Figure 6:
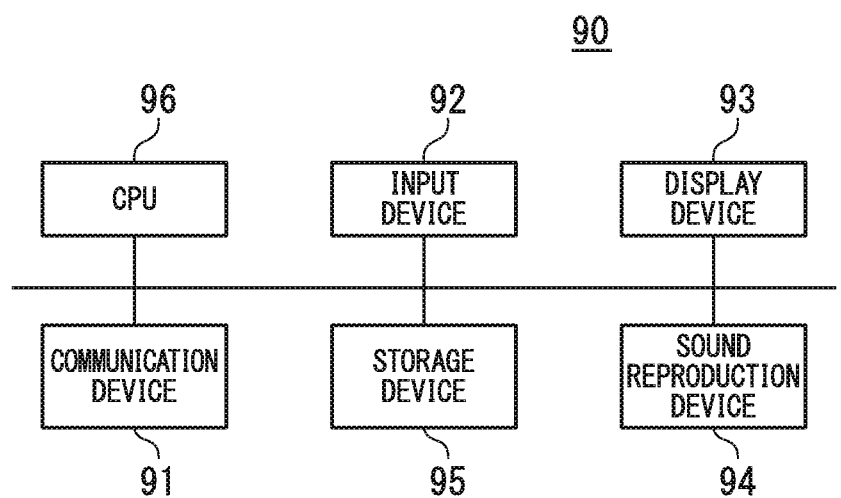
FIG. 6 is a diagram showing a configuration of a computer system according to an embodiment.

FIG. 6 is a block diagram showing a configuration of the computer system 90.

For example, the computer system 90 includes a communication device 91, an input device 92, a display device 93, a storage device 95, and a central processing device (CPU) 96. These components are connected through a bus such that they can communicate with each other.

The communication device 91 is a communication module such as a communication IC and performs communication with other devices through the network NW.

For example, the input device 92 is an input module such as a keyboard, a mouse, a touch pad, a microphone to which various instructions are input through sound, or the like, and various instructions are input to the input device 92 according to operations of a user. The input device 92 may be configured by being integrated with a display (display device 93) as a touch panel.

The display device 93 is a display module that displays information such as images and text and includes a liquid crystal display panel, an organic electroluminescence (EL) display panel and the like.

A sound reproduction device 94 is a sound reproduction module that outputs sound such as dialogue, background music and sound effects and includes a speaker and the like.

The storage device 95 includes a hard disk drive (HDD), a solid state drive (SSD), an electrically erasable programmable read-only memory (EEPROM), a read-only memory (ROM), a random access memory (RAM) and the like, for example, and stores various types of data processed by the terminal device 10 and the server device 30, game control programs and the like. Further, the storage device 95 is not limited to a storage device embedded in the terminal device 10 and the server device 30 and may be an external storage device connected through a digital input/output port or the like, such as a universal serial bus (USB).

The CPU 96 executes various programs stored in the storage device 95 and controls each component included in the computer system 90.

Further, the computer system 90 may include any hardware such as a camera, an acceleration sensor, a gyro sensor, a global positioning system (GPS) or a reception module which is not shown.

The computer system 90 has been described above.

[Configuration of Terminal Device 10]

Next, a configuration of the terminal device 10 will be described.

Figure 7:
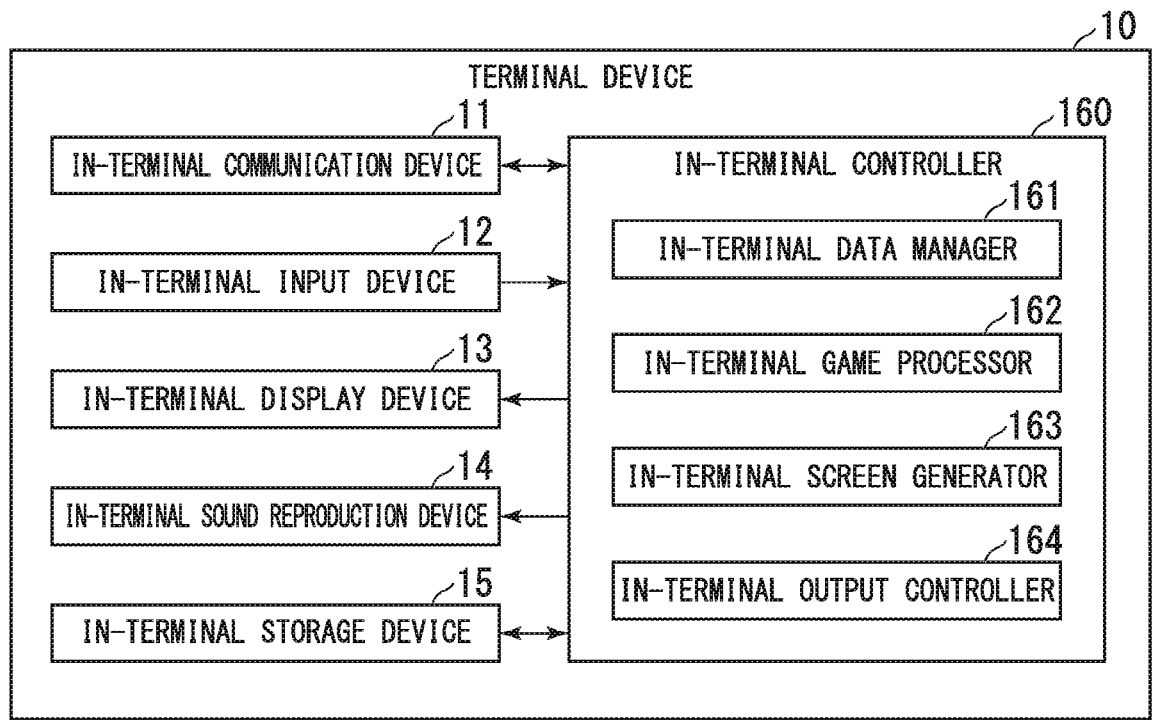
FIG. 7 is a block diagram showing a configuration of a terminal device according to an embodiment.

FIG. 7 is a block diagram showing a configuration of the terminal device 10.

The terminal device 10 includes an in-terminal communication device 11, an in-terminal input device 12, an in-terminal display device 13, an in-terminal sound reproduction device 14, an in-terminal storage device 15 and an in-terminal controller 160.

The in-terminal communication device 11 is connected to the network NW and communicates with the server device 30.

The inter-terminal input device 12 receives an operation of a user. In the following, a case in which the in-terminal input device 12 is configured by being integrated with the in-terminal display device 13 as a touch panel will be described as an example. In this case, a user can select an operator by touching the position of the operator disposed on a game screen with a finger or a stylus pen on the display surface of the in-terminal display device 13. In addition, any operation input, such as an operation of touching the display surface of the in-terminal display device 13 with a finger or a stylus pen and then sliding while touching, a so-called flicking (swiping) operation, or a long pressing operation of touching the same position and continuing to touch, can be applied.

The in-terminal display device 13 displays a game screen.

A game screen is an image that notifies a user of information such as game progress states and results of games. Further, a game screen is an image for receiving game operations of a user and guiding game operations. That is, a game screen is an example of a user interface. For example, a user can select operators such as various buttons and icons disposed on a game screen through an operation applied to the in-terminal display device 13.

Meanwhile, one set of image information simultaneously displayed on one in-terminal display device 13 may be referred to as a "screen" in the present embodiment. A screen may be composed of one image or may be composed by arranging or superposing a plurality of images. Further, a screen may include text. A screen may also be composed of only text.

The in-terminal sound reproduction device 14 reproduces game sound.

The in-terminal storage device 15 stores data necessary to execute in-terminal game control programs and game control programs.

The in-terminal controller 160 controls each component included in the terminal device 10. For example, the inter-terminal controller 160 is realized by a CPU included in the terminal device 10 which executes a game control program stored in the in-terminal storage device 15. In addition, a part of or the entire in-terminal controller 160 may be realized as an integrated circuit of hardware such as a large scale integration (LSI) circuit or an application specific integrated circuit (ASIC).

The in-terminal controller 160 includes an in-terminal data manager 161, an in-terminal game processor 162, an in-terminal screen generator 163 and an in-terminal output controller 164.

The in-terminal data manager 161 manages data. Management of data includes control of transmission/reception of data to/from other devices and control of writing of data to the in-terminal storage device 15 and readout of data from the in-terminal storage device 15. The in-terminal data manager 161 outputs data acquired from the server device 30 and data read from the in-terminal storage device 15 to the in-terminal game processor 162, the in-terminal screen generator 163 and the in-terminal output controller 164. Further, the in-terminal data manager 161 transmits data acquired from the in-terminal game processor 162 to the server device 30 or writes the data to the in-terminal storage device 15.

The in-terminal game processor 162 performs control for executing games. The in-terminal game processor 162 may perform substantial processes for progressing primary games and secondary games in the terminal device and perform subsidiary processes for progressing primary games and secondary games in the server device 30. For example, the in-terminal game processor 162 may complete processes for progressing games only in the terminal device. In the present embodiment, a case in which substantial game processes are performed in the server device 30 is described as an example.

The in-terminal screen generator 163 generates game screens. The in-terminal screen generator 163 outputs image data of generated game screens to the in-terminal output controller 164.

The in-terminal output controller 164 controls outputs such as display of an image and reproduction of sound. For example, the in-terminal output controller 164 outputs image data acquired from the in-terminal screen generator 163 to the in-terminal display device 13 and causes a game screen to be displayed.

The configuration of the terminal device 10 has been described above.

[Configuration of Server Device 30]

Next, a configuration of the server device 30 will be described.

Figure 8:
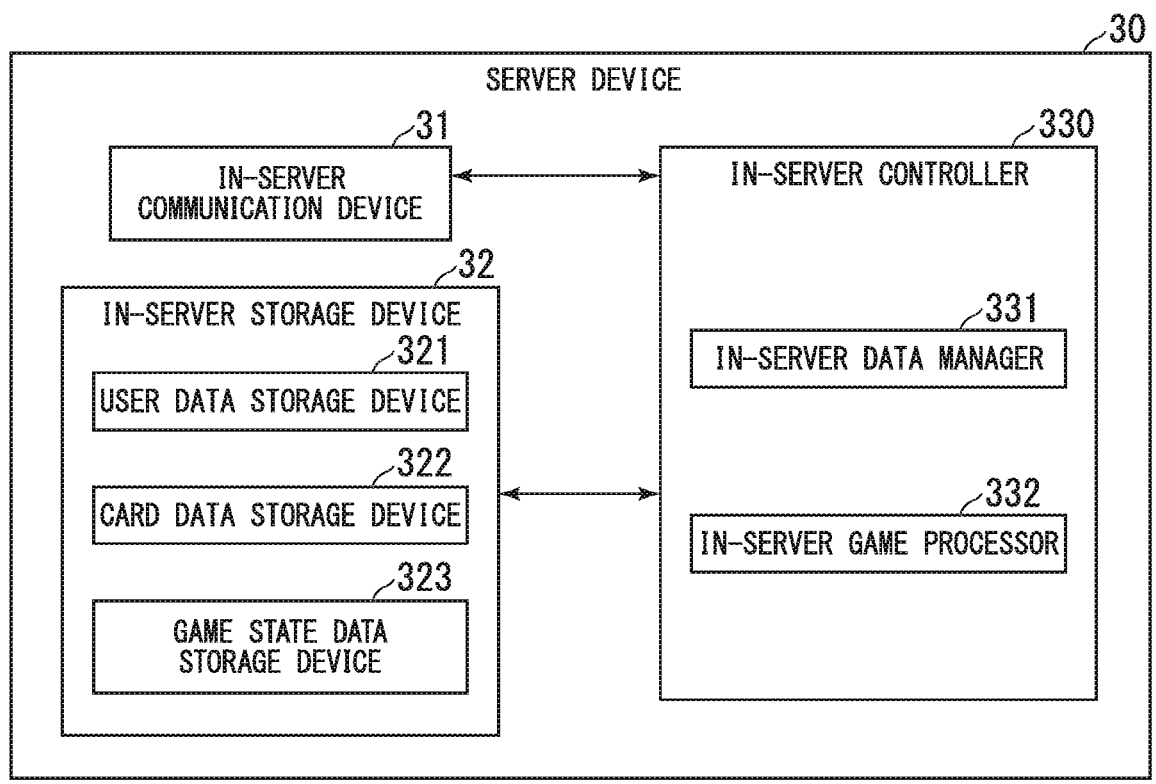
FIG. 8 is a block diagram showing a configuration of a server device according to an embodiment.

FIG. 8 is a block diagram showing a configuration of the server device 30.

The server device 30 includes an in-server communication device 31, an in-server storage device 32 and an in-server controller 330.

The in-server communication device 31 is connected to the network NW and communicates with the terminal device 10.

The in-server storage device 32 stores in-server game control programs and data necessary to execute the game control programs. The in-server storage device 32 includes a user data storage device 321, a card data storage device 322 and a game state data storage device 323.

The user data storage device 321 stores user data. User data is data that describes user-specific information. In user data, information such as player levels, user names, friend users, the amounts of in-game money and possessed items are associated with player identifiers (IDs) and described, for example. A player ID is information for identifying a user. In the present embodiment, association with a player ID may be referred to as "association with a user." In addition, when information associated with a user ID is indicated, expression of "of user" may be used in the present embodiment. Possession refers to association of a game object with a user in the present embodiment. For example, in a possession state, identification information of a game object is associated with a player ID of a user. In addition, the number (amount) of game objects is associated with a player ID of a user, for example, in a possession state. Here, the user possesses the game objects and the game objects are possessions of the user. The user can use the game objects possessed by the user. As described above, a game object may be consumed by being used. In this case, the game system 1 cancels association of an amount of consumed game objects with a player ID among game objects associated with the player ID.

The card data storage device 322 stores card data. Card data is data that describes card information. For example, information about cards such as card names, types, levels, offensive power, defense power, overview, effects, versions and images are associated with card IDs and described in card data.

The game state data storage device 323 stores game state data. Game state data is data that describes game states of a card game played by a user. Since game states momentarily change with the progress of a game, game state data is constantly updated with the progress of the game. For example, information about arrangement of cards and information about a battling state between a user and an opponent are described in game state data.

The in-server controller 330 controls each component included in the server device 30. The in-server controller 330 is realized by a CPU included in the terminal device 10 which executes game control programs stored in the in-server storage device 32, for example. In addition, a part of or entire in-server controller 330 may be realized as an integrated circuit of hardware such as an LSI or an ASIC.

The in-server controller 330 includes an in-server data manager 331 and an in-server game processor 332.

The in-server data manager 331 manages data regarding processes of the server device 30. Management of data includes control of transmission/reception of data to/from other devices and control of writing of data to the in-server storage device 32 and readout of data from the in-server storage device 32. The in-server data manager 331 outputs data acquired from the terminal device 10 and data read from the in-server storage device 32 to the in-server game processor 332. In addition, the in-server data manager 331 transmits data acquired from the in-server game processor 332 to the server device 30 or writes the data to the in-server storage device 32.

The in-server game processor 332 performs control for executing games. The in-server game processor 332 may perform substantial processes for progressing primary games and secondary games in the server device and perform subsidiary processes for progressing primary games and secondary games in the terminal device 10. For example, the in-server game processor 332 may complete processes for progressing games only in the server device.

In addition, the in-server game processor 332 performs a process such as matching of users.

As described above, substantial game processes are performed in the server device 30 as an example in the present embodiment. In this case, the terminal device 10 notifies the server device 30 of details of game operations when the game operations are received from a user. The server device 30 executes processes for progressing through a game on the basis of the details of the game operations notified of by the terminal device 10. Here, the server device 30 updates various types of data as necessary. The server device 30 notifies the terminal device 10 of a processing result. Then, the terminal device 10 displays a game screen or reproduces game sound on the basis of the processing result notified of by the server device 30. Accordingly, the game system 1 can update the game screen or reproduce sound according to the details of the operations.

Here, a specific example of processes for progressing a game, which are performed by at least one of the in-terminal game processor 162 of the terminal device 10 and the in-server game processor 332 of the server device 30, is described. Here, a case in which the in-server game processor 332 executes major processes for progressing a game is described as an example.

For example, the in-server game processor 332 executes a process for causing quest selection icons to appear on a game screen. The in-server game processor 332 determines whether to cause quest selection icons to appear at a predetermined frequency. For example, the in-server game processor 332 determines whether a total number of selectable quest selection icons is less than an appearance upper limit value and causes quest selection icons to appear at a predetermined probability when the total number of selectable quest selection icons is less than the appearance upper limit value in each entire world screen. Here, "selectable" means that images such as quest selection icons are disposed on a game screen in a state in which selection of a user is accepted. For example, images such as quest selection icons may be selectable by being newly arranged on a game screen. In addition, according to change from a state in which selection of images such as quest selection icons disposed on a game screen in advance is not received to a state in which the selection is received, for example, the icons may be selectable. When the in-server game processor 332 causes quest selection icons to appear, the in-server game processor 332 determines quest selection icons to appear and appearance positions and arranges the icons and the appearance positions on a game screen.

In addition, the in-server game processor 332 starts a quest when a quest selection icon is selected by a user, for example. Starting a quest refers to starting determination of whether target achievement conditions set in the quest have been satisfied and determination of whether quest end conditions have been satisfied. When the quest includes a battle, the in-server game processor 332 executes processes for the battle. The in-server game processor 332 determines whether a part or all of the target achievement conditions and the quest end conditions have been satisfied according to the progress of the battle and the result of the battle. When the quest has been achieved in termination of the quest, the in-server game processor 332 associates a predetermined reward according to the achieved quest with the user and stores the reward associated with the user. That is, the in-server game processor 332 stores the reward as a possession of the user. Meanwhile, the in-server game processor 332 may determine a reward among a plurality of predetermined game objects such as cards, items and money in games according to drawing lots or determine the reward without drawing lots.

The configuration of the server device 30 has been described above.

[Game Screen]

Next, game screens provided in the game system 1 will be described.

Figure 9:
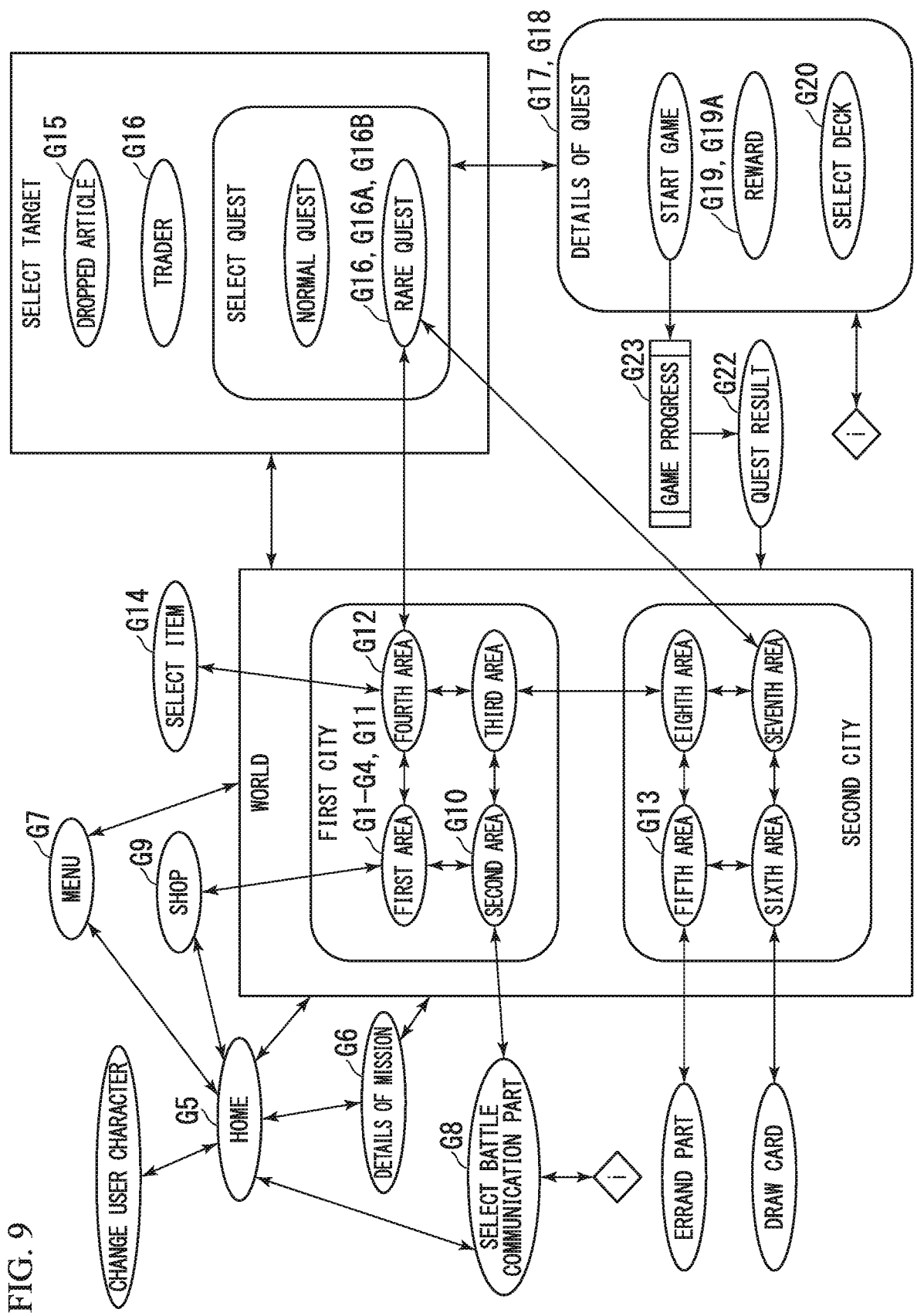
FIG. 9 is a diagram showing transition of game screens according to an embodiment.

FIG. 9 is a diagram showing transition between game screens according to the present embodiment.

In the example shown in FIG. 9, an oval indicates a game screen or an operator arranged on a game screen. In addition, a plurality of functionally related game screens and images are indicated by rectangles or rectangles with round corners. An arrow represents that transition from one game screen to another game screen is possible. The transition between game screens shown in FIG. 9 is an example and may be arbitrarily changed. For example, an arbitrary game screen may be inserted between game screens or an arbitrary game screen may be omitted. Further, transition from an arbitrary game screen to another game screen may occur. In addition, a game screen transition direction may be limited to one direction or may be reversible.

[Game Screen Part Selection Screen]

Next, examples of game screens will be sequentially described.

First, a home screen will be described.

Figure 10:
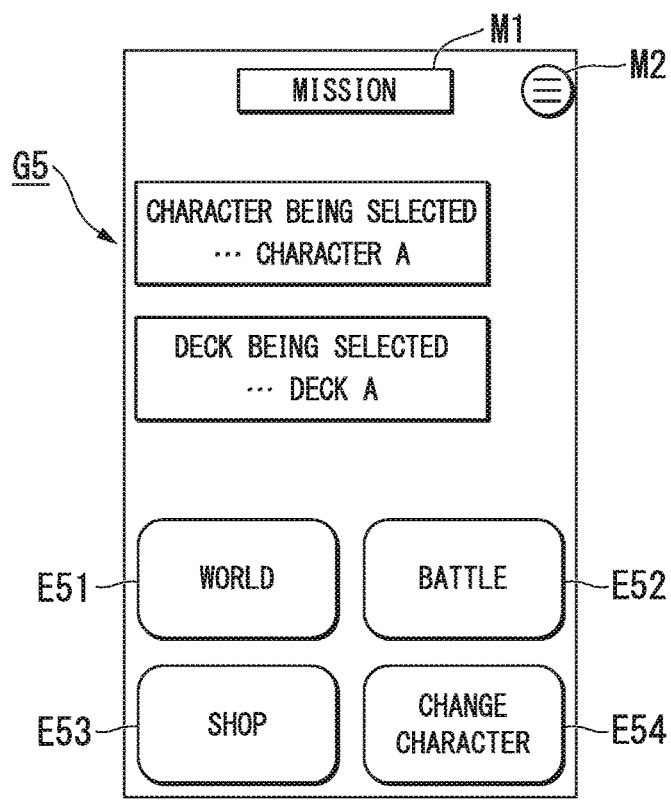
FIG. 10 is a diagram showing a game part selection screen according to an embodiment.

FIG. 10 is a diagram showing a home screen.

The home screen is a screen through which a game part is selected. The home screen G5 is a screen initially displayed when a game control program is started. However, a screen initially displayed when a game control program is started may be another arbitrary screen. Further, a transition from a mission details screen, a menu screen, a battle part selection screen, a shop screen, a world screen or the like, for example, to the home screen may occur.

In the example shown in FIG. 10, a player character selected as an operation object (hereinafter, referred to as an "operation character"), and a deck selected as an object used for a play are displayed on the home screen G5. In addition, four part selection buttons E51 to E54, a mission display button M1 and a menu display button M2 are provided on the home screen.

The mission display button is an operator for displaying the mission details screen.

The menu display button is an operator for displaying a menu screen.

The part selection button is an operator for receiving selection of a game part. One part selection button is associated with one game part. For example, the part selection buttons E51 to E54 respectively correspond to a world part, a communication battle part, a shop part and a player character change part in the example shown in FIG. 10.

The world part provides a function of roaming a map in which appearance control icons are disposed.

The communication battle part provides a function of battling with users of other terminal devices 10 connected to the server device 30.

The player character change part provides a function of changing player characters.

When a user selects a game part selection button, the game system 1 causes transition from a game screen to a game part according to the selected part selection button. For example, when the part selection button E51 is selected in the example shown in FIG. 10, at least any of world screens G1 to G4 and G101 to G13 is displayed. In addition, when the part selection button E52 is selected, for example, a communication battle part selection screen G8 is displayed. Further, when the part selection button E53 is selected, for example, a shop screen G9 is displayed. Moreover, when the part selection button E54 is selected, for example, a player character change screen is displayed.

The player character change screen is a screen for changing player characters.

A player character is a character that virtually acts as an avatar of a user in a game and is a so-called avatar. In the present embodiment, a user can play while switching a plurality of player characters.

Figure 11:
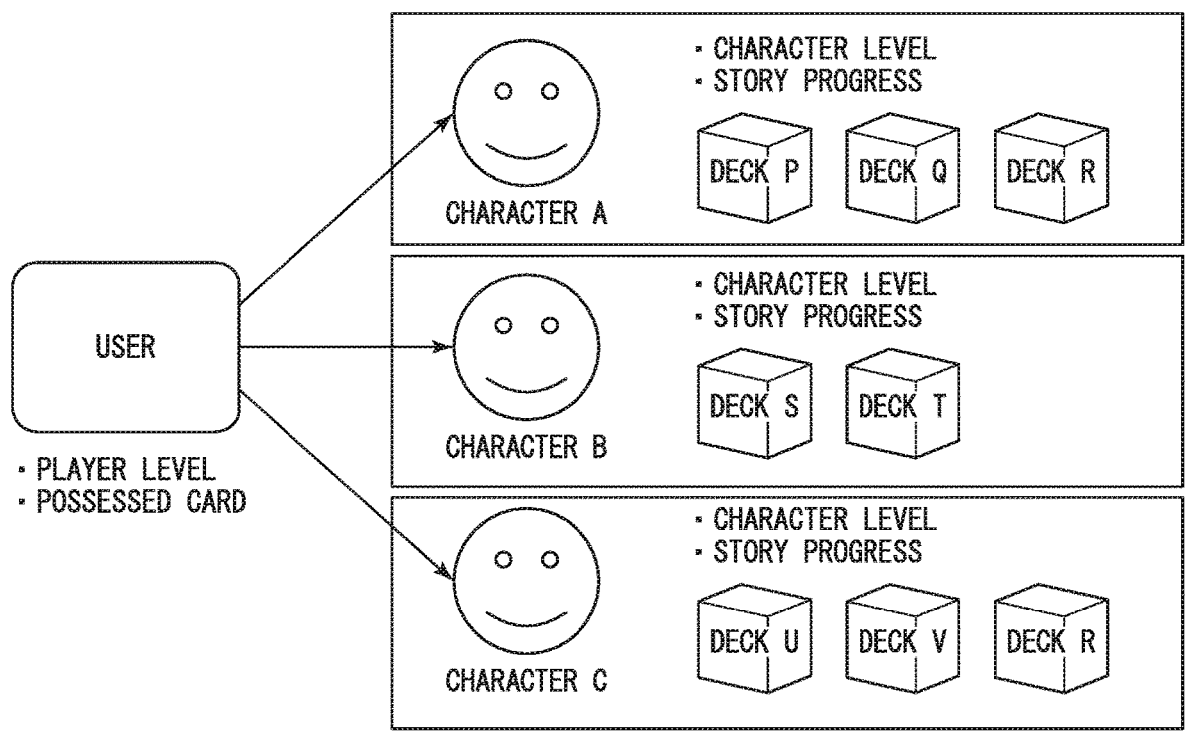
FIG. 11 is a diagram showing a relationship between a user and player characters according to an embodiment.

FIG. 11 is a diagram showing a relationship between a user and player characters.

In the example shown in FIG. 11, the user can have three player characters "A" to "C" as operation objects. Different stories (game developments) are prepared for the respective player characters "A" to "C" and the user can independently progress a game for each player character. Meanwhile, progresses of the games of the player characters "A" to "C" may be completely independent or may affect each other.

Player character-specific attributes such as a character level and a character parameter may be set in each of the player characters "A" to "C." The character level is an example of an index indicating a degree of growth of a player character. The character level is information managed for each user by being associated with a player ID. The character parameter is an example of an index indicating characteristics of a player character. Operation characters and player characters that are not selected as operation objects are managed such that the operation characters can be distinguished from the player characters. The user can change numerical values such as character levels and character parameters of operation characters by progressing through a game.

In addition, cards are associated with the user in the example shown in FIG. 11. Further, decks are associated with the player characters "A" to "C." For example, decks "P" to "R" are associated with the player character "A" as possessed decks. All of the decks "P" to "R" are composed of cards selected from cards possessed by the user. The user can use the decks "P" to "R" in a battle in the battle part when the player character "A" is selected as an operation object.

Meanwhile, the above-described information association of the user with player characters may be arbitrarily changed. For example, cards may be associated with player characters instead of the user. Specifically, when cards are associated with player characters, the game system 1 may allow the user to be able to play a game using the cards associated with operation characters as possessed cards. In addition, decks may be associated with the user instead of player characters, for example. That is, the game system 1 may allow the user to be able to select decks used to play a game irrespective of operation characters.

The home screen has been described above.

[Game Screen: Mission Details Screen]

Next, the mission details screen will be described.

Figure 12:
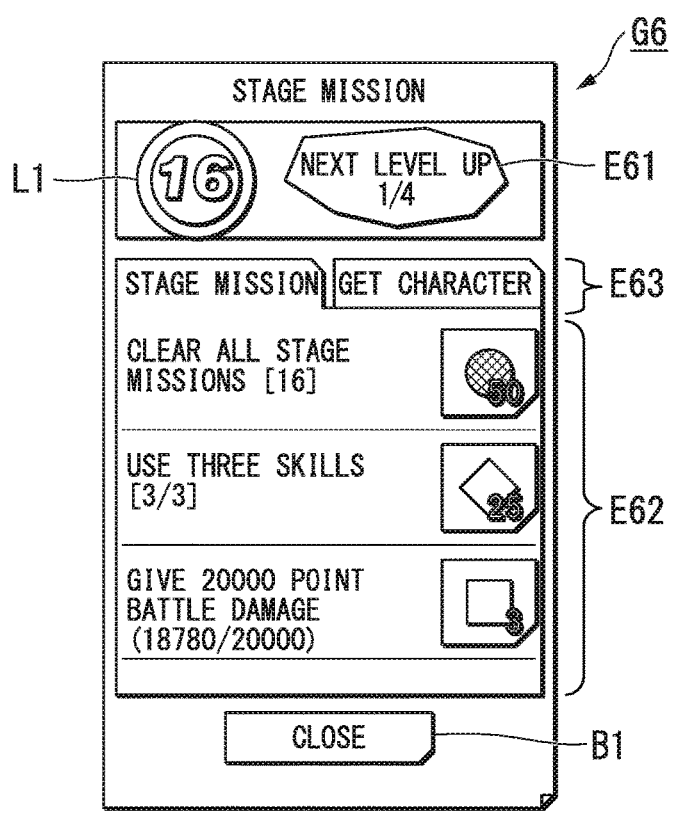
FIG. 12 is a diagram showing a screen displaying details of a mission according to an embodiment.

FIG. 12 is a diagram showing the mission details screen.

The mission details screen is a screen for displaying details of missions. For example, transition from the home screen and the world screen to the mission details screen can occur.

In the example shown in FIG. 12, the player level display section L1, a mission achievement ratio display section E61, a mission content display section E62, a switching tab E63 and a back button B1 are provided on the mission details screen G6.

Here, a mission is described.

A mission (task) is a condition for changing a specific parameter or causing a specific game object or game part to be available. As a mission, a condition relating to an arbitrary game object or game part, such as a battle result, a battle state, an item utilization state, a command utilization state, a game part utilization state, the amount of in-game money, states of achievement of other missions, a card utilization state, a card acquisition state and a character level of a player character, is applicable. Missions may have a plurality of types. For example, missions may have types such as a daily mission, a weekly mission, a mission according to player level and a mission according to progress of a story. A mission is achieved when prescribed conditions are satisfied.

Here, a mission according to player level is referred to as a "stage mission."

Figure 13:
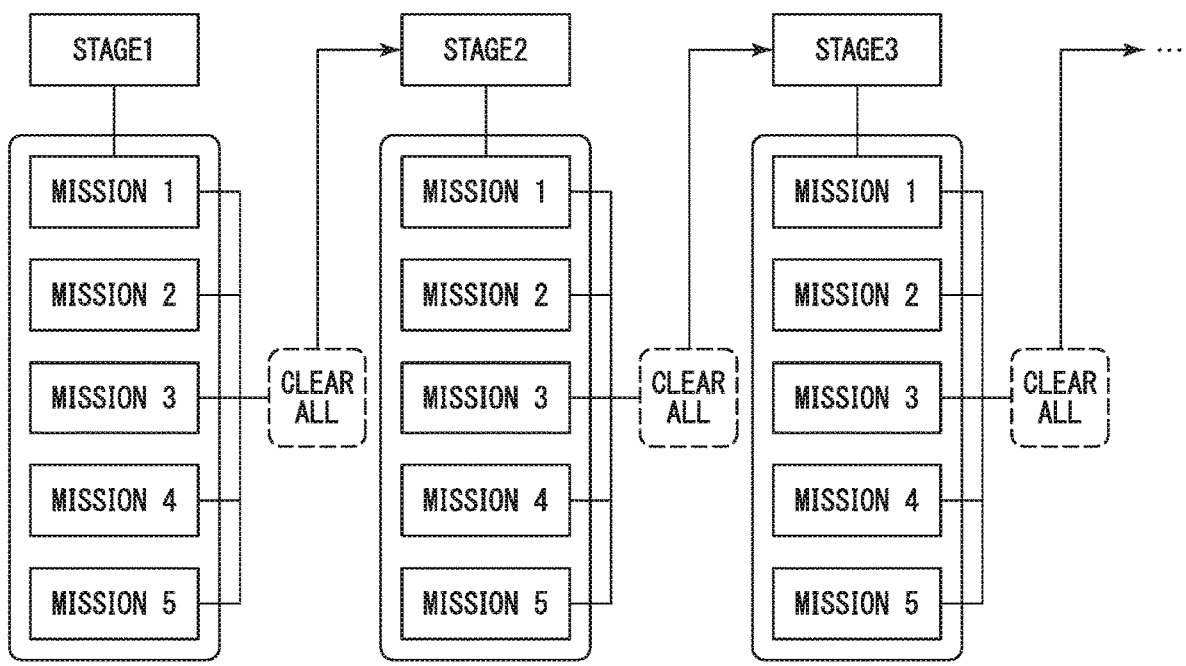
FIG. 13 is a diagram showing a relationship between a player level and a mission.

FIG. 13 is a diagram showing a relationship between a player level and a stage mission.

In the example shown in FIG. 13, one or more stage missions are predetermined for each player level (stage). When a stage mission is achieved, a predetermined game object such as an item, in-game money, a card, or a deck is given to a user as a reward. Giving a reward is associating a game object that is a reward with a user. That is, giving a reward is causing a user to be able to use a game object that is a reward. For example, a reward is given in such a manner that a game object that is the reward is added as a possession of a user. All stage missions for respective player levels are achieved, game stage 1 increases the player level.

A player level is associated with information relating to a quest appearance rule, and the like. For example, a player level is associated with a difficulty level of a quest, an appearance time interval, an appearance probability, an appearance upper limit value and the like. Accordingly, when a player level has increased, for example, the game system 1 can increase a difficulty level of a quest, increase the number of types of quest, increase appearance frequencies of all quest selection icons, increase an appearance frequency of a specific quest selection icon or increase appearance upper limit values of quest selection icons. Accordingly, a user easily selects a desired quest if the user can increase the player level. Therefore, the game system 1 can motivate a user to increase the player level and encourage the user to play a game.

Further, a player level may be associated with an arbitrary game object or part in addition to information relating to a quest appearance rule. For example, a player level may be associated with permission of utilization of a specific game part, an upper limit value of the number of decks that can be preserved, an upper limit value of the number of cards that can be possessed, and the like. Accordingly, when a player level has increased, for example, the game system 1 can cause a specific game part to be available, cause a larger number of decks to be preservable or cause a larger number of cards to be possessable. Therefore, the game system 1 can motivate a user to increase the player level and encourage the user to play a game. Meanwhile, the details of a game object or a game part that becomes available according to player level increase may be checked or may not be checked before the game object or game part becomes available. For example, when a shop part is available at a predetermined player level, the game system 1 may arrange a shop icon before the predetermined player level is reached or cause the shop icon to newly appear when the predetermined player level has reached. When the shop icon is disposed in advance, the game system 1 may not receive operations with respect to the shop icon until the predetermined player level is reached.

In addition, the game system 1 may change an appearance state of appearance control icons when the game system 1 increases a player level. For example, the game system 1 may increase a player level and simultaneously cause all or part of appearance control icons as many as the number of appearance upper limit values. Here, appearance control icons which have already appeared before the player level is increased may be deleted or may be left. Accordingly, a larger number of appearance control icons can newly appear when a player level is increased when the number of appearance control icons that have appeared before the player level is increased is smaller. That is, to play a larger number of quests, it is effective for a user to frequently play quests such that the number of appearances of appearance control icons decreases when a player level is increased. Accordingly, the game system 1 can motivate the user to play a game. In addition, to play a larger number of desired quests, it is effective for the user to select a quest to be played in view of a timing at which the player level is increased. Accordingly, the game system 1 can give strategic properties to selection of a quest to be played and thus can attract a user's attention more strongly.

Missions have been described above.

The mission details screen is continuously described.

The mission achievement ratio display section is a section displaying a proportion of achieved missions to all stages missions at a current player level.

The switching tab is an operator for changing types of mission to be displayed. In the example shown in FIG. 12, the switching tab E63 can be used for switching between a stage mission and a character getting mission for increasing the number of available player characters.

The mission content display section is a section displaying the details of a mission selected through the switching tab and the details of a reward when the mission is achieved.

The back button is an operator for returning display to a screen displayed before the current game screen.

The mission details screen has been described above.

[Game Screen: Menu Screen]

Next, the menu screen will be described.

Figure 14:
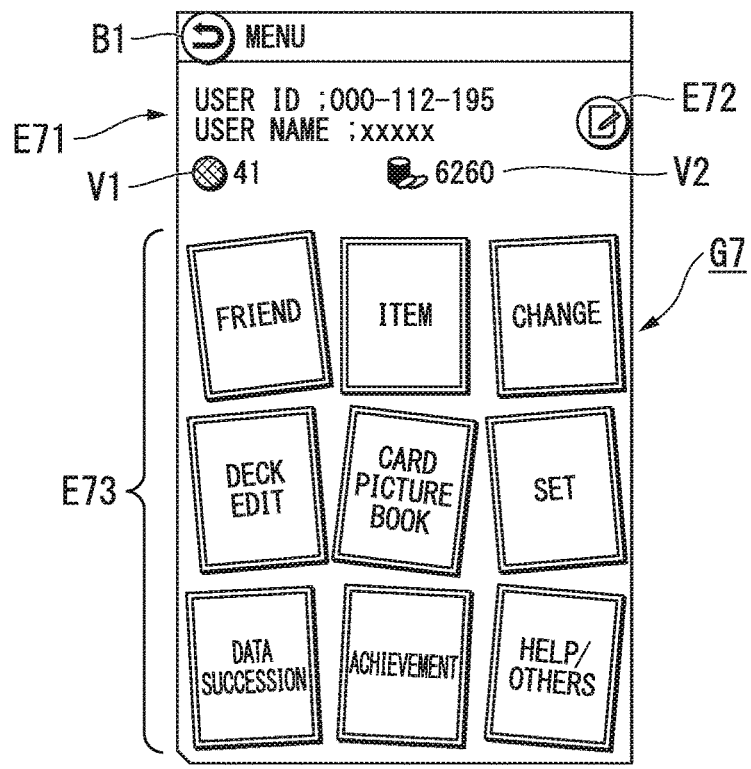
FIG. 14 is a diagram showing a menu screen according to an embodiment.

FIG. 14 is a diagram showing the menu screen.

The menu screen is a screen through which a sub-menu that is a secondary function is selected. For example, transition from the home screen or the world screen to the menu screen can occur.

In the example shown in FIG. 14, a user information display section E71, a first game money amount display section V1, a second game money amount display section V2, a memo button E72 and a plurality of sub-menu selection buttons E73 are provided on the menu screen G7.

The user information display section is a section displaying user identification information. In the example shown in FIG. 14, the game system 1 displays a player ID and a user name in the user information display section E71.

The first game money amount display section displays the amount of first in-game money.

The second game money amount display section displays the amount of second in-game money.

Here, two types of money, the first in-game money and the second in-game money, are present in a game in the present embodiment. The first in-game money can be mainly acquired by being purchased by a user using real money. The second in-game money can be mainly acquired according to progress of a game. However, a method of acquiring in-game money may be arbitrary.

The memo button is an operator for providing a memo function. The memo function is a function of storing an arbitrary character string desired by, a user such that the character string can be referred to. When the memo button is selected, the game system 1 receives input of arbitrary text. The game system 1 stores data of the input text.

The sub-menu selection button is an operator through which a sub-menu is selected. For example, in the example shown in FIG. 14, a friend display button for displaying a friend of a user, an item display button for displaying icons possessed by the user, a change button for changing a visual aspect of a game screen, a deck editing button for editing a deck, a card picture book button for displaying cards possessed by the user, a settings button for changing settings of a game, a data succession button for performing succession of data from other games, an achievement button for displaying a game progress state, and a help/other button for displaying help and the like are disposed as the sub-menu selection buttons E73.

The menu screen has been described above.

[Game Screen: Communication Battle Part Selection Screen]

Next, the communication battle part selection screen will be described.

Figure 15:
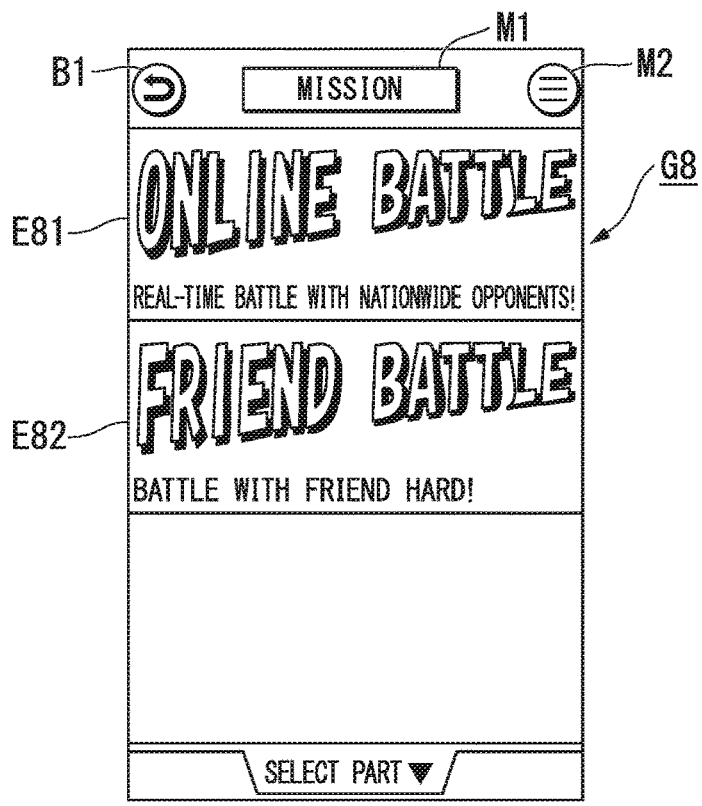
FIG. 15 is a diagram showing a battle part selection screen according to an embodiment.

FIG. 15 is a diagram showing the communication battle part selection screen.

The communication battle part selection screen is a screen through which a communication battle part is selected. For example, transition from the part selection screen or the world selection screen to the communication battle part selection screen can occur.

An online battle selection button E81 and a friend battle button E82 are provided on the communication battle part selection screen G8 shown in FIG. 15.

The online battle selection button is an operator for starting an online battle part.

The friend battle button is an operator for starting a friend battle part.

Here, there are two types of communication battle part, an online battle part and a friend battle part, in the present embodiment.

The online battle part is a game part for battling with a user randomly extracted from users of other terminal devices 10 connected to the server device 30.

The friend battle part is a game part for battling with a user in a friend relationship with the user of the device thereof among users of other terminal devices 10 connected to the server device 30.

A friend is a relationship between two users associated with each other, for example. In the following, associating and managing two users as friends may be referred to as "friend registration." Friend registration may be performed through an arbitrary method at an arbitrary time. For example, in friend registration, application for friend registration is performed from one user to another user. In addition, when the user who receives the application approves registration, player IDs of the two users are associated and stored in user data of the respective users. For example, application for friend registration may be performed by inputting a user's player ID that desires to be registered through the menu screen or may be performed for a user that is an opponent after playing using an online battle part.

The communication battle part selection screen has been described above.

[Game Screen: Shop Screen]

Next, the shop screen will be described.

Figure 16:
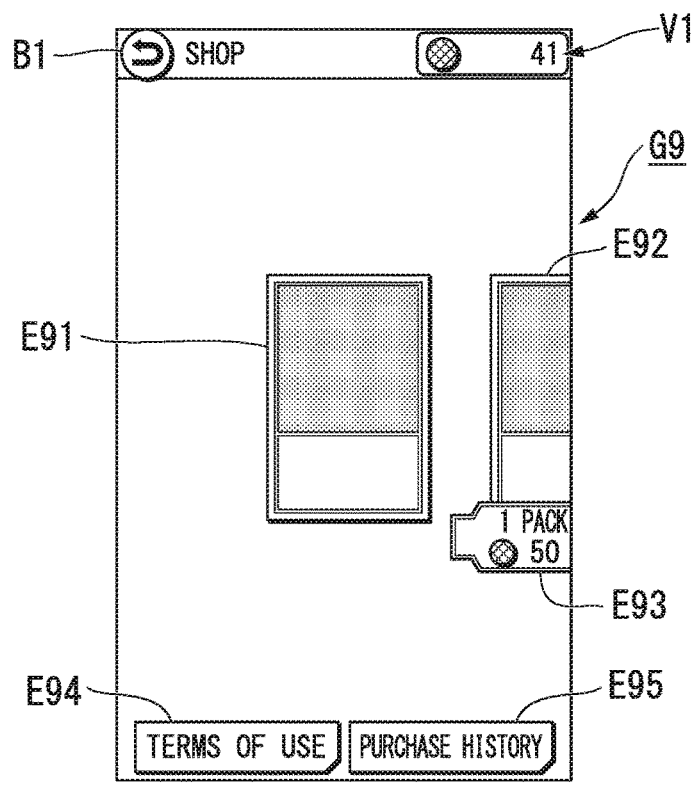
FIG. 16 is a diagram showing a shop screen according to an embodiment.
Figure 17:
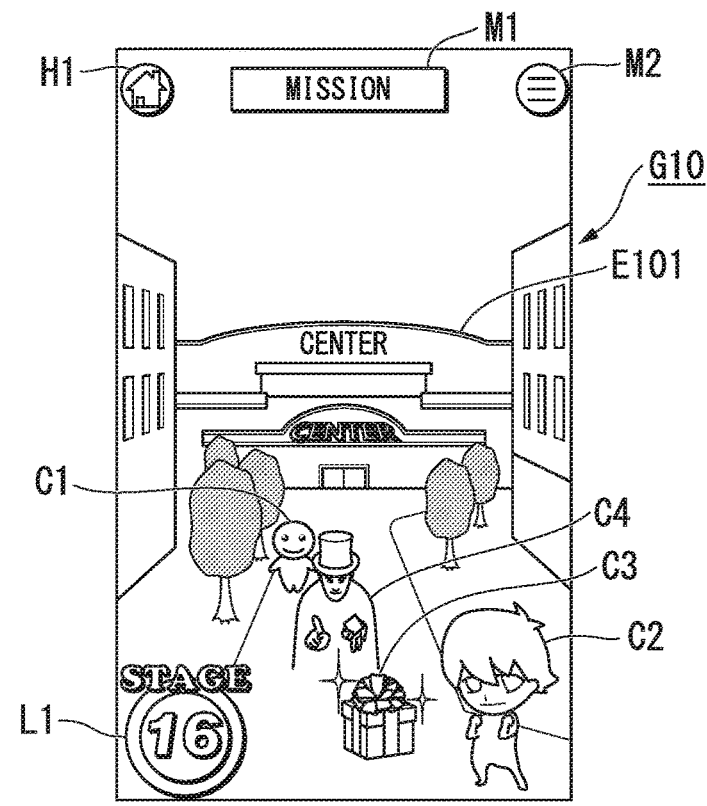
FIG. 17 is a first diagram showing a world screen according to an embodiment.
Figure 18:
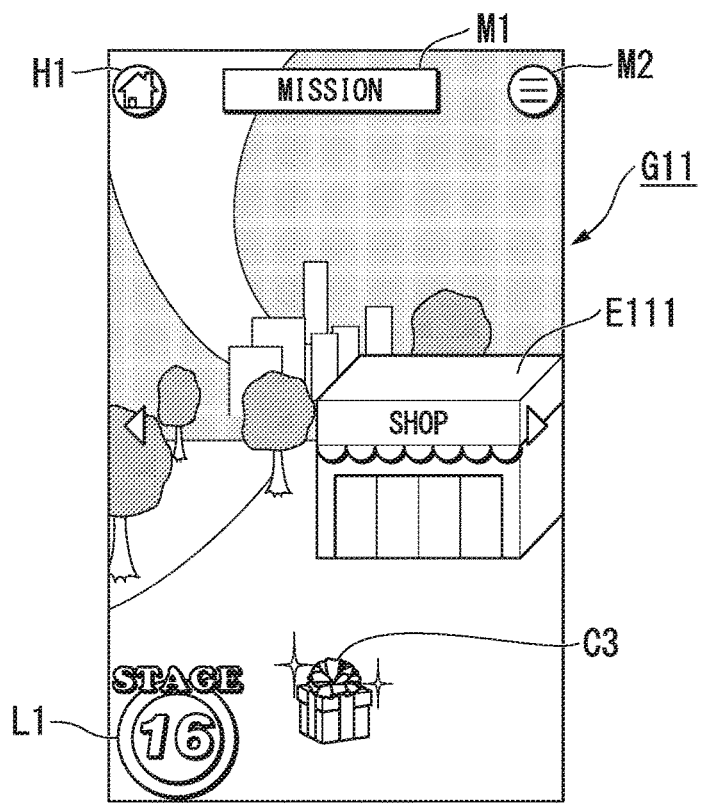
FIG. 18 is a second diagram showing a world screen according to an embodiment.
Figure 19:
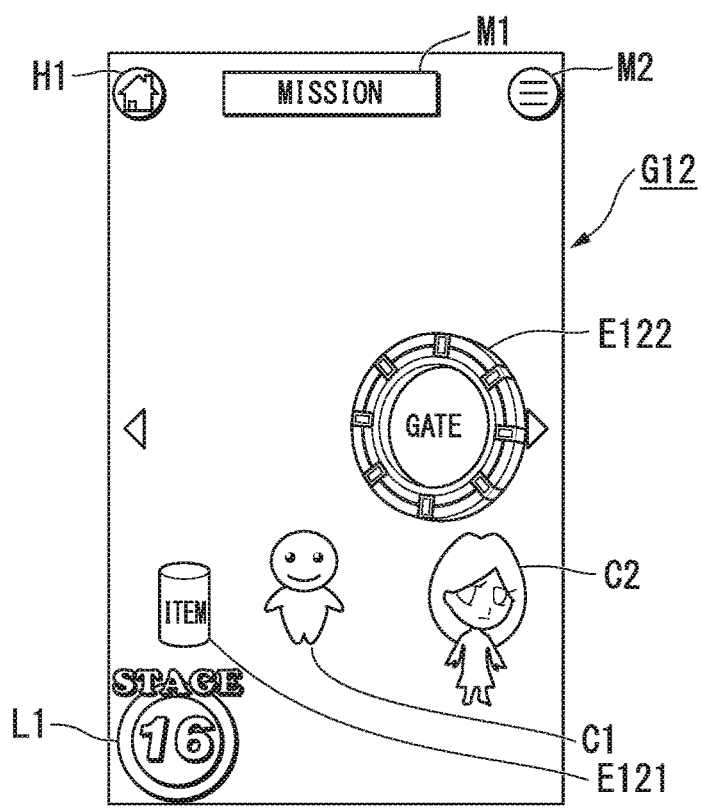
FIG. 19 is a third diagram showing a world screen according to an embodiment.
Figure 20:
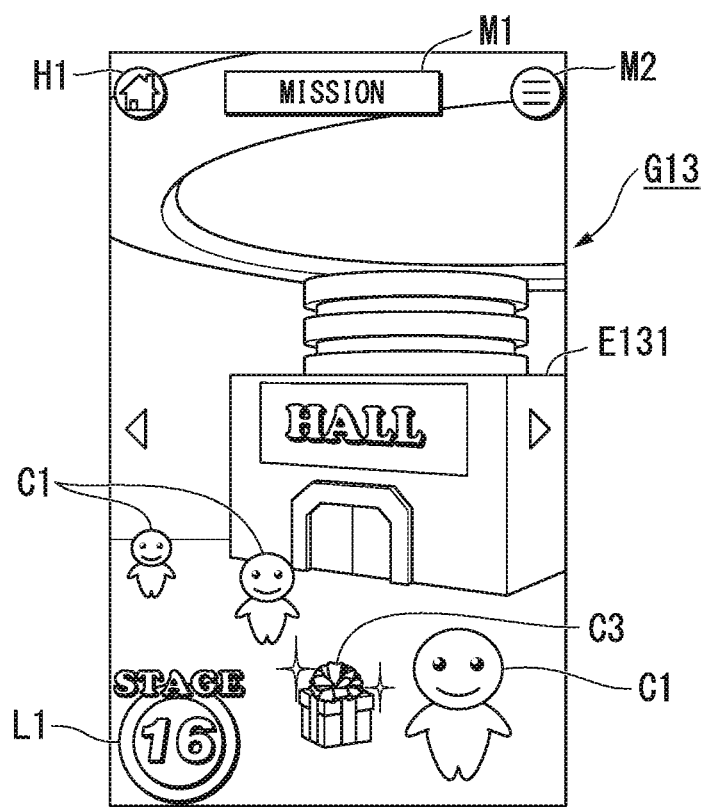
FIG. 20 is a fourth diagram showing a world screen according to an embodiment.

FIG. 16 is a diagram showing the shop screen.

The shop screen is a game screen in a shop part. For example, transition from the home screen or the world screen to the shop screen can occur.

In the example shown in FIG. 16, a plurality of article icons E91, E92, . . . , an article price display section E93, a terms-of-use button E94 and a purchase history button E95 are provided on the shop screen G9.

The article icon is an operator through which the overview of an article is displayed and purchase of the article is performed. For example, it is possible to switch articles that can be selected through article icons according to a click operation. Examples of articles may include game objects such as a card, a deck, an item, a command and a player character, for example. An article may be a combination of a plurality of game objects. One or a plurality of game objects may constitute one article. For example, an article may be a package obtained by combining cards having a specific attribute, or the like. In addition, details of an article may not be decided until the article is actually purchased. For example, the details of an article may be determined through drawing from cards having a specific attribute when the article is purchased.

The article price display section displays the price of an article using the first in-game money. When the price of an article is free, the article price display section may not be provided.

Article assortments and article prices may be changed according to parameters in games, such as a player level, or may be changed according to information unrelated to games, such as real world time (coordinated universal time or Greenwich mean time) and the position of the terminal device 10.

The terms-of-use button E94 is an operator for displaying details of a contract between a game providing source and a user and notice in purchase of articles.

The purchase history button E95 is an operator for displaying an article purchase history.

The shop screen has been described above.

[Game Screen: World Screen]

Next world screens will be described.

FIG. 17 to FIG. 20 are diagrams showing world screens.

The world screen is a game screen in a world part. For example, transition from the home screen, the mission details screen, the menu screen, the communication battle part selection screen, the item selection screen, the rare quest selection screen, a quest details screen, a quest result screen or the like to the world screen can occur.

In the examples shown in FIG. 17 to FIG. 20, a home button H is provided on the world screens G10 to G13.

The home button H1 is an operator for transition of display to the part selection screen.

In addition, the world screens G10 to G13 correspond to different areas. Further, the home button H1 for transition to the home screen G5 is disposed on the world screens G10 to G13.

An area is a virtual region in a game.

Figure 21:
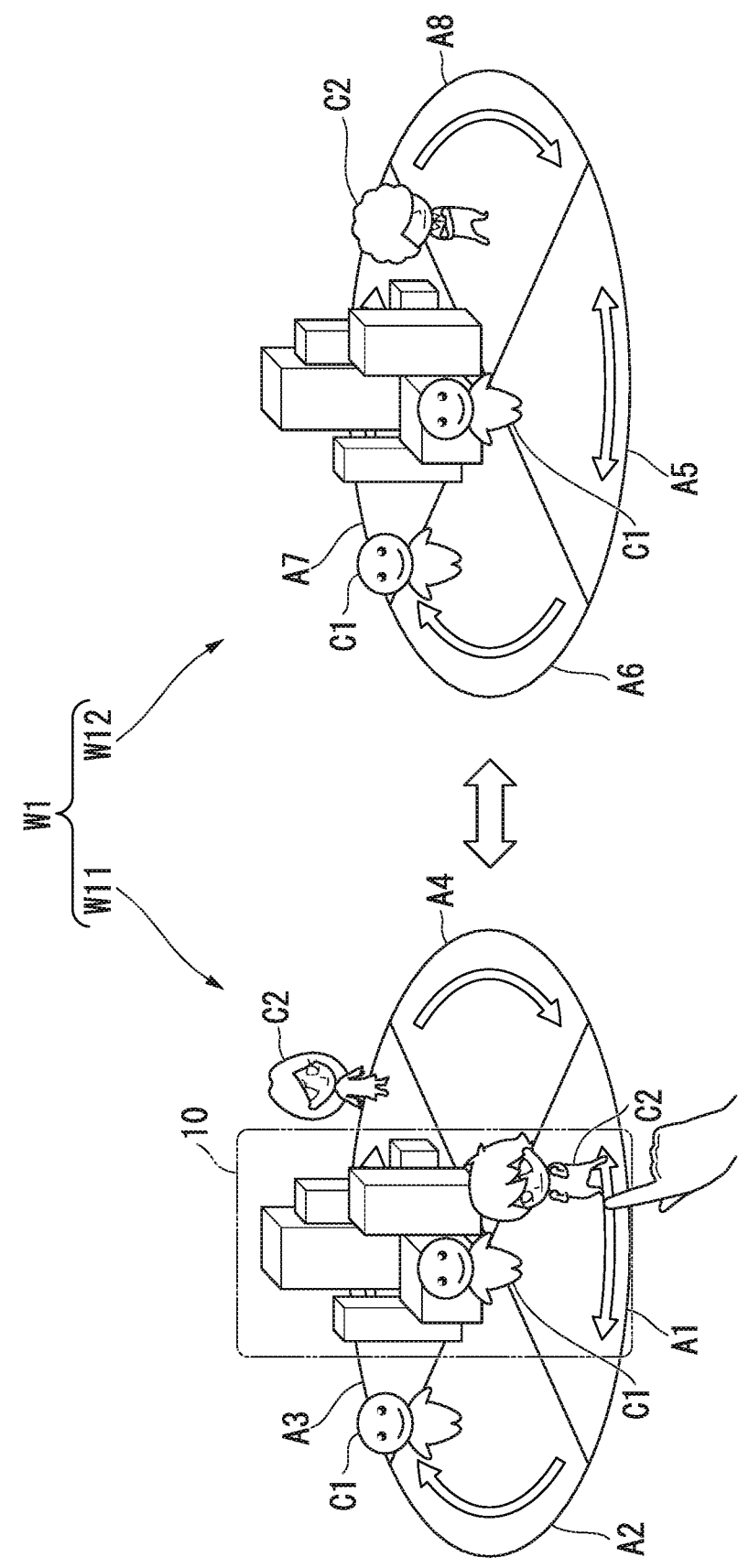
FIG. 21 is a diagram showing a relationship between areas according to an embodiment.

FIG. 21 is a diagram showing a relationship between areas.

In the present embodiment, a whole virtual space is referred to as a "world." In the example shown in FIG. 21, a world W1 has two cities, a first city W11 and a second city W12. The first city W11 has four neighboring areas A1 to A4. The second city W12 has four neighboring areas A5 to A8. In a world part, a world screen corresponding one of these plurality of areas is displayed. Movement between areas can be performed according to a flicking operation, for example. When a user indicates movement of an area, a world screen switches to a world screen corresponding to an area that is a movement destination.

Game objects associated with other game parts are disposed as virtual buildings in each area. A user can select these game objects through world screens to use game parts according to the selected objects. For example, a center icon E101, a shop icon E111, an item use icon E121, a gate icon E122 and a hall icon E131 are display on respective worlds screens G10 to G13. The center icon E101 is associated with the communication battle part selection screen G8. The shop icon E111 is associated with the shop screen G9. The item use icon E121 is associated with the item selection screen G14. The gate icon E122 is associated with rare quest selection screens G17, G17A, and G17B. The hall icon E131 is associated with an errand part which will be described later. In addition, in the area A4 of the first city W11 and the area A6 of the second city, game objects that associate the areas with each other are provided, although they are not shown. That is, a user can move to other cities by operating these game objects.

In addition, the game system 1 causes a quest selection icon, a trader icon, a dropped article icon and the like to appear on world screens. For example, in the example shown in FIG. 17, a quest selection icon C1 for a normal quest, a quest selection icon C2 for a rare quest, a dropped article icon C3 and a trader icon C4 are disposed on the world screen G10. In this manner, the game system 1 can simultaneously display a plurality of appearance control icons on one game screen. When a plurality of appearance control icons are simultaneously displayed on one world screen, the game system 1 may display the plurality of appearance control icons side by side or in a superimposed manner. Further, when a depth is set for a game screen, the game system 1 may display another appearance control icon in front of or behind a certain appearance control icon.

When a user selects the quest selection icon for a normal quest, the game system 1 displays a quest details screen of the normal quest. When the quest selection icon for a rare quest is selected, the game system 1 displays a quest details screen of the rare quest. After the normal quest and the rare quest are played, the quest selection icons pertaining to the played quests disappear.

When the dropped article icon is selected, the game system 1 displays a dropped article acquisition screen. Then, the game system 1 provides an item, in-game money, and the like and causes the dropped article icon to disappear.

When the trader icon is selected, the game system 1 displays a trader screen. The game system 1 may cause the selected trader icon to disappear or cause the selected trader icon to continuously appear.

Here, the appearance of a quest selection icon, a trader icon and a dropped article icon is described. In the following, the quest selection icon will be described as an example.

The number of appearances of a quest selection icon is managed in the whole world W1, for example. In this case, an appearance upper limit value of the quest selection icon is set with respect to the world W1. Then, the quest selection icon is newly disposed in any of the areas A1 to A8 with the elapse of time until the number of appearances of the quest selection icon in the whole world W1 reaches the appearance upper limit value. When the number of appearances of the quest selection icon reaches the appearance upper limit value, the game system 1 may cause the quest selection icon not to appear or cause a new quest selection icon to appear in exchange for disappearance of the quest selection icon that has appeared. That is, quest selection icons may be switched. Further, the number of appearances of a quest selection icon may be managed for each area or each city.

In addition, the number of appearances of a quest selection icon may be managed for each quest type or details. In this case, an appearance upper limit value of a normal quest and an appearance upper limit value of a rare quest are set for each quest type or details.

Further, arrangement of quest selection icons may be managed for each quest type or details. In addition, arrangement of quest selection icons may be fixed for each quest type or details or determined when quest selection icons are caused to appear, for example. Quest selection icons may be commonly disposed in the first city W1 and the second city W2 in the case of normal quests and may be individually disposed in the first city and the second city in the case of rare quests. Specifically, the four areas A1 to A4 of the first city W1 may be caused to correspond one-to-one to the four areas A5 to A8 of the second city W2, and the same quest selection icons are disposed in areas corresponding to each other with respect to normal quests. On the other hand, the same quest selection icons are not disposed in the first city W11 and the second city W12 with respect to rare quests.

In addition, quest types or details may be set according to places or time. For example, when a quest caused to appear according to drawing from a set of quests is selected, the set of quests which is a reference source may be different according to appearance places (areas) or time. Accordingly, it is possible to cause a quest selection icon of a specific quest to appear in a specific area at a specific timing.

Further, quest types or details may be different according to player characters, parameters of player characters, user levels or the like. For example, a quest selection icon of a rare quest which is specific to a player character may be caused to appear.

In addition, an appearance frequency of a quest selection icon may be set for each quest type or details. For example, in the case of a rare quest, a quest selection icon may be caused to appear at a lower frequency compared to normal quests.

Further, an appearance frequency of a quest selection icon may be different according to player characters, parameters of player characters, user levels or the like. For example, an appearance frequency of a rare quest may be set to be relatively high in the case of a player character "A" and an appearance frequency of a normal quest may be set to be relatively high in the case of a player character "B."

In addition, an appearance frequency of a quest selection icon may be adjusted according to a time interval or an appearance probability. For example, a quest selection icon may appear at a predetermined time interval. Further, whether to cause a quest selection icon to appear may be determined at a predetermined time interval, for example. Here, the quest selection icon may appear at a predetermined probability. In addition, the game system 1 may provide, to the user, information about an appearance frequency such as a time until the next appearance of a quest selection icon and the like as represented in the time display section E22 of FIG. 2.

As described above, the game system 1 causes quest selection icons to appear with the elapse of time. Thus, a user cannot determine which quest is selectable until quest selection icons appear. Accordingly, the game system 1 can give the user expectancy with respect to quests that will be selectable in the future. In addition, the game system 1 causes quest selection icons to appear in any of a plurality of areas, that is, a plurality of world screens. Thus, a user cannot determine which quest is selectable only by checking one world screen. Accordingly, the game system 1 can give the user anticipation with respect to selectable quests.

In addition, the game system 1 selects a position at which a quest selection icon appears on a world screen whenever a quest selection icon appears. Accordingly, the game system 1 can also causes a change in a world screen when the same quest appears and thus does not make users feel bored. In addition, the game system 1 can allow a user to be interested in searching quest selection icons.

In addition, the game system 1 displays an operator for switching to other game parts on a world screen. For example, in the examples shown in FIG. 17 to FIG. 20, the game system 1 displays the center icon E101, the shop icon E111, the item use icon E121, the gate icon E122, and the hall icon E131.

The center icon is an operator for starting a communication battle part. When the center icon is selected, the game system 1 displays the communication battle part selection screen.

The item use icon is an operator for starting an item selection part. When the icon use icon is selected, the game system 1 displays an item selection screen.

The gate icon is an operator for starting a rare quest selection part. When the gate icon is selected, the game system 1 displays the rare quest selection screen.

The hall icon is an operator for starting an errand part. The errand part is a game part that provides a function of causing a reward according to game objects such as player characters or cards possessed by a user to be attainable in exchange for causing the game objects to be temporarily unavailable. A specific example of the errand part is described. First, the game system 1 receives selection of an unavailable card from a user. The game system 1 causes the selected card to be unavailable for a predetermined period. In addition, the game system 1 adds a card different from the card caused to be unavailable to cards possessed by the user as a reward after the elapse of the predetermined period. Here, the details of the reward may be determined on the basis of the card caused to be unavailable or the period in which the card is unavailable. In addition, the period in which the card is unavailable may be set by the user. Further, the card caused to be unavailable may be available after the elapse of the predetermined period or may be unavailable even after the elapse of the predetermined period.

In this manner, the game system 1 provides an operator for switching to other parts on a game screen on which quest selection icons appear. Thus, a user visually recognizes presence of other parts while searching quest selection icons or the like. Accordingly, the game system 1 can easily guide the user to other parts. For example, when the center icon and a quest selection icon of a rare quest are simultaneously displayed, a situation in which a user who intended to select a center discovers the quest selection icon of the rare quest may occur. That is, even in a situation in which the user did not intend to play the rare quest, the user has the opportunity to play the rare quest. Accordingly, the game system 1 can raise the user's interest in the game.

Meanwhile, the game system 1 may display an operator for switching to other parts and a quest selection icon side by side or in a superimposed manner. For example, a quest selection icon may be displayed in front of the operator for switching to other parts.

Further, in a shop function that is available according to the trader icon, assortments or prices of articles may be set according to place or time or may be different according to player characters, parameters of player characters, user levels or the like. In the same manner, game objects that can be acquired according to the dropped article icon may be set according to place or time or may be different according to player characters, parameters of player characters, user levels or the like.

In addition, an appearance frequency of the trader icon may be set according to place or time or may be different according to player characters, parameters of player characters, user levels or the like. In the same manner, an appearance frequency of the dropped article icon may be set according to place or time or may be different according to player characters, parameters of player characters, user levels or the like.

Furthermore, the game system 1 may control appearance of the trader icon and the dropped article icon on the basis of the same appearance rule as that of quest selection icons or on the basis of an appearance rule different from that of quest selection icons. For example, when quest selection icons do not appear, the game system 1 may cause the dropped article icon or the trader icon to appear at a high frequency. In addition, the dropped article icon or the trader icon may disappear when a predetermined time elapses from appearance. Accordingly, even in cases in which a user thinks that quest selection icons do not appear, the game system 1 can motivate the uses to search worlds to play games. In addition, since the game system 1 allows a user to be interested in searching for the dropped article icon or the trader icon even during a waiting time until a quest appears, the user can effectively use the waiting time.

The world screens have been described above.

[Game Screen: Item Selection Screen]

Next, the item selection screen will be described.

Figure 22:
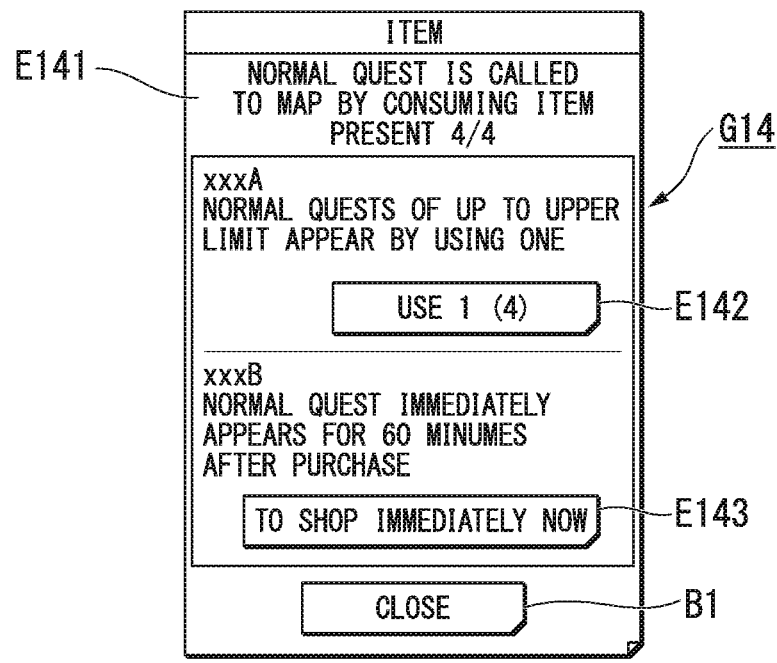
FIG. 22 is a diagram showing an item selection screen according to an embodiment.

FIG. 22 is a diagram showing the item selection screen.

The item selection screen is a game screen through which selection of an item to be used is received. For example, transition from a world screen to the item selection screen can be performed.

In the example shown in FIG. 22, an item display section E141 and item selection buttons E142 and E143 are provided on the item selection screen G14.

The item display section E141 is a section for displaying an image of an item and description of an item. In the case of the example shown in FIG. 22, an appearance control item is displayed in the item display section E141.

The appearance control item is an item that changes the appearance state and the appearance rule of an appearance control icon. Items that change the appearance state of an appearance control icon may include an item that causes appearance control icons of an appearance upper limit value to immediately appear, an item that causes a predetermined number of new appearance control icons to immediately appear, and the like, for example. In addition, items that change an appearance rule may include an item that decreases an appearance time interval, an item that enhances an appearance probability, an item that increases an appearance upper limit value, and the like, for example. The effects of appearance control items may be temporary or permanent. Further, the effects of appearance items may be exhibited for specific appearance control icons or all appearance control icons. Specifically, an item by which an appearance time interval of a quest selection icon becomes zero for one hour may be present as an appearance control item.

The item selection buttons E142 and E143 have different functions according to whether a user possesses an item. In the case of the example shown in FIG. 22, the item selection button E142 corresponds to a case in which the user possesses an item and the item selection button E143 corresponds to a case in which the user does not possesses an item. In this case, the item selection button E142 functions as an operator through which use of an item is accepted and the item selection button E143 functions as an operator through which an item is purchased. That is, when the item selection button E142 is selected, an item corresponding thereto is used, and when the item selection button E143 is selected, an item is added in exchange for consumption of a value of in-game money.

Further, when the item selection button E143 is selected, an item may be used in exchange for consumption of the price of the item. That is, a process of adding an item to be possessed may be omitted and the item may be used simultaneously with purchase thereof.

The item selection screen has been described above.

[Game Screen: Dropped Article Acquisition Screen]

Next, a dropped article acquisition screen will be described.

Figure 23:
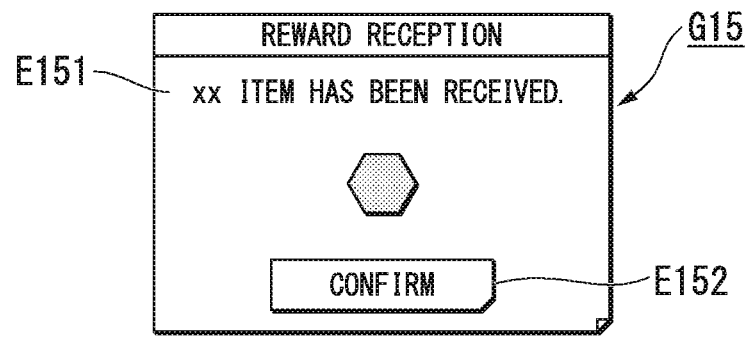
FIG. 23 is a diagram showing a dropped article acquisition screen according to an embodiment.

FIG. 23 is a diagram showing the dropped article acquisition screen.

The dropped article acquisition screen is a screen for notifying a user of acquisition of a dropped article. For example, transition from a world screen to the dropped article acquisition screen can occur.

In the example shown in FIG. 23, a dropped article display section E151 and a confirmation button E152 are provided on the dropped article acquisition screen G15.

The dropped article display section displays a game object given as a dropped article according to selection of a dropped article icon.

The confirmation button is an operator selected when a user confirms a dropped article. When the confirmation button is selected, the game system 1 adds a dropped article to the possession of the user and returns the game screen to a world screen.

The dropped article acquisition screen has been described above.

[Game Screen: Trader Screen]

Next, the trader screen will be described.

Figure 24:
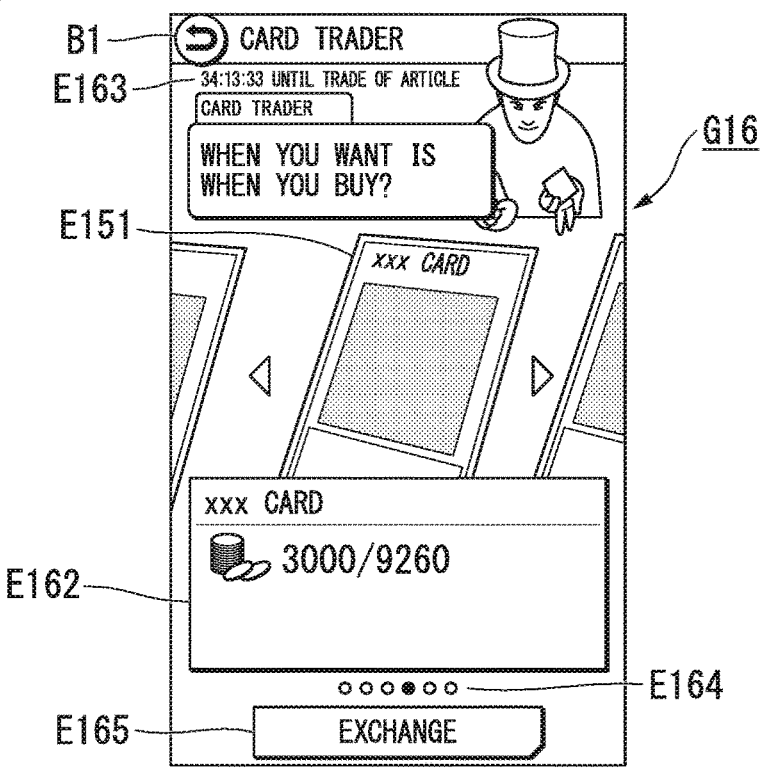
FIG. 24 is a diagram showing a trader screen according to an embodiment.

FIG. 24 is a diagram showing the trader screen.

The trader screen is a screen through which cards are exchanged. In addition, the trader screen may be an example of a game screen in the shop part. For example, transition from a world screen to the trader screen G16 can occur.

In the example shown in FIG. 24, an article icon E161, an article description section E162, an article exchange time display section E163, an article indicator E164 and an exchange button E165 are provided on the trader screen G16.

The article icon is an image of a card that is an article. Cards displayed at the article icon E161 can be switched according to a flicking operation, for example.

The article description section displays the name, description, price, current number of possessions and the like of an article. Here, article prices are displayed using the second in-game money on the trader screen G16 as an example.

The article exchange time display section displays a time until assortment of articles changes. That is, when the time displayed in the article exchange time display section has elapsed, assortment of articles is changed.

The article indicator indicates a relative position of an article for which information is presented on the current screen among all selectable articles on the trader screen. For example, information on the fourth article from the left among six articles is presented in the case of the example shown in FIG. 24.

The exchange button is an operator for purchasing (exchanging) an article. When the exchange button is selected, the game system 1 adds a card that is an article to the possession of the user in exchange for consumption of the price.

The trader screen has been described above.

[Game Screen: Rare Quest Selection Screen]

Next, the rare quest selection screen will be described.

Figure 25:
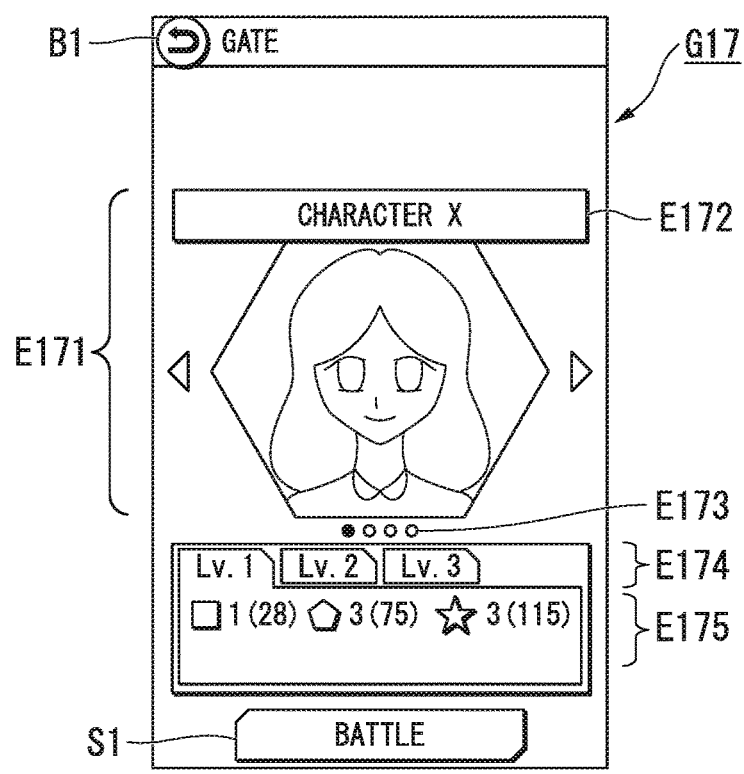
FIG. 25 is a first diagram showing a rare quest selection screen according to an embodiment.
Figure 26:
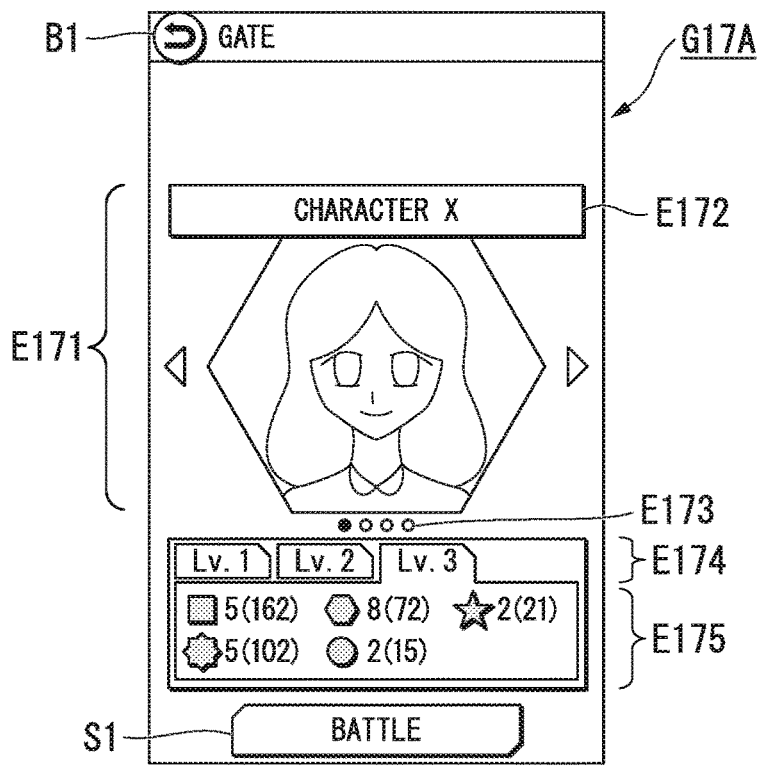
FIG. 26 is a second diagram showing a rare quest selection screen according to an embodiment.
Figure 27:
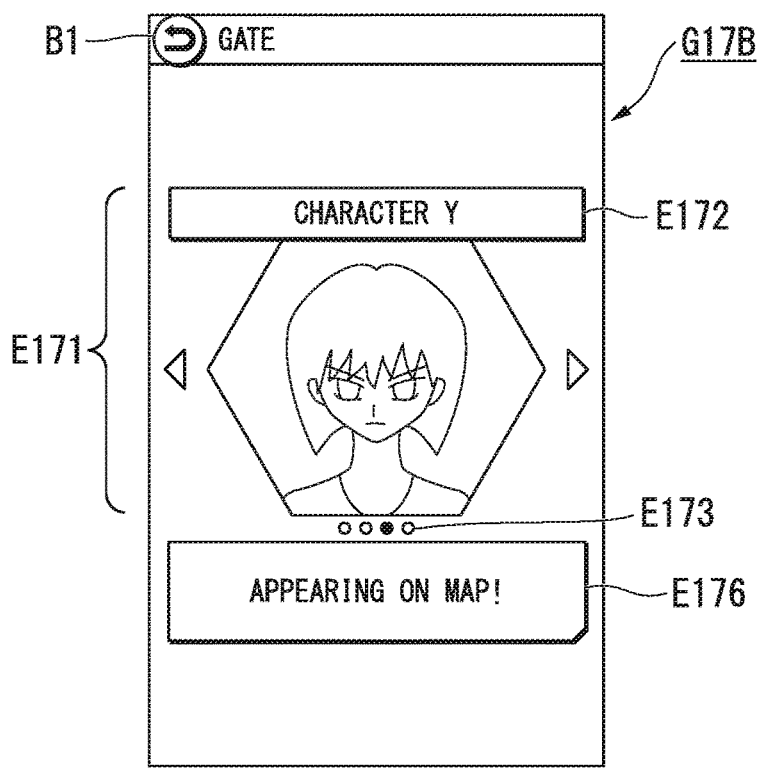
FIG. 27 is a third diagram showing a rare quest screen according to an embodiment.

FIG. 25 to FIG. 27 are diagrams showing the rare quest selection screen.

The rare quest selection screen is a screen through which a rare quest is selected. For example, transition from a world screen to the rare quest selection screen can occur. The game system 1 causes a desired rare quest to be played in exchange for a predetermined price through the rare quest selection screen. Accordingly, a user can immediately play a desired rare quest without waiting for appearance of a quest selection icon.

In the examples shown in FIG. 25 to FIG. 27, a quest overview display section E171, a quest details display button E172, and a quest indicator E173 are provided on the rare quest selection screens G17, G17A and G17B. In addition, a quest level tab E174, a quest price display section E175 and a battle button S1 are provided on the rare quest selection screens G17 and G17A. Further, an information provision section E176 is provided on the rare quest selection screen G17B instead of the quest level tab E174 and the quest price display section E175 which are provided on the rare quest selection screens G17 and G17A.

The quest overview display section displays the name of a rare quest, an image representing the overview of the rare quest, and the like as the overview of the rare quest.

The quest details display button is an operator for displaying details of a rare quest such as a reward and a game rule. When the quest details display button is selected, the game system 1 displays a reward confirmation screen, for example.

The quest indicator indicates a relative position of a rare quest for which information is displayed on the current screen among all selectable rare quests on the rare quest selection screen. For example, information on the first rare quest from the left among four rare quests is displayed in the case of the example of FIG. 25.

The quest level tab is an operator through which the quest level of a rare quest being displayed is switched. A quest level is an example of an index indicating a difficulty level of a quest, the details of a reward, a reward selection method or the like.

The quest price display section displays a price necessary to play a rare quest. Display of the quest price display section changes according to the details and quest levels of rare quests. For example, in the case of the example shown in FIG. 25, level "1" is selected in the quest level tab E174 and the price corresponding to level "1" is displayed in the quest price display section E175. In addition, in the case of the example shown in FIG. 26, for example, level "3" is selected in the quest level tab E174 and the price corresponding to level "3" is displayed in the quest price display section E175. The number of necessary prices may be indicated by the ratio to the number of possessions of the user.

The battle button is an operator through which a request for starting play of a quest is received. When the battle button is selected, the game system 1 starts a process of a battle.

Here, a rare quest can be started by operating the quest selection icon of the rare quest in addition to operation of the rare quest selection screen. In addition, when a rare quest is played through a quest selection icon, a price is not necessary. Accordingly, when the quest selection icon of the same rare quest as a rare quest that can be selected through the rare quest selection screen appears, it is desirable for the user to play the rare quest through the quest selection icon. In addition, when the quest selection icon of a rare quest appears, the game system 1 displays the information provision section E176 to notify of the appearance of the quest selection icon (FIG. 27, for example). Accordingly, the user can play the rare quest without wastefully consuming the price.

The quest selection screen has been described above.

[Game Screen: Quest Confirmation Screen]

Next, a quest confirmation screen will be described.

The quest confirmation screen is a screen through which the details of a quest are confirmed. For example, transition from a world screen to the quest confirmation screen can occur. In the present embodiment, the game system 1 displays different quest confirmation screens in the case of a normal quest and in the case of a rare quest as an example.

First, a quest confirmation screen with respect to rare quests will be described.

Figure 28:
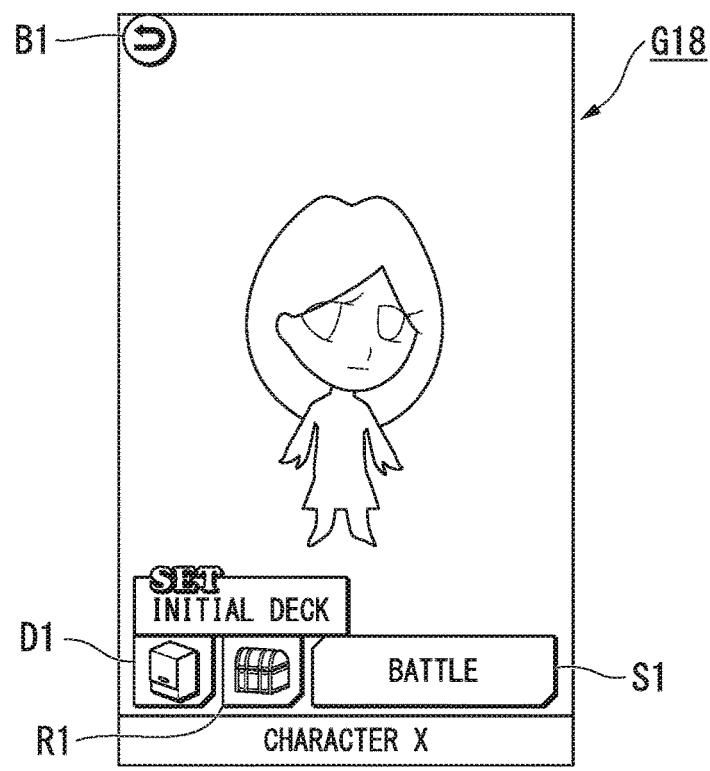
FIG. 28 is a diagram showing a quest confirmation screen according to a rare quest according to an embodiment.

FIG. 28 is a diagram showing a quest confirmation screen with respect to rare quests.

In the example shown in FIG. 28, a reward confirmation button R1, a deck setting button D1 and a battle button S1 are provided on the quest confirmation screen G18.

The reward confirmation button is an operator for displaying a reward confirmation screen. That is, the reward confirmation button is an operator for confirming the details of a reward given according to achievement of a rare quest. The reward confirmation screen will be described later.

The deck setting button is an operator for displaying a deck information screen. That is, the deck setting button is an operator for setting a deck used for a battle. The deck information screen will be described later.

Next, a quest confirmation screen with respect to normal quests will be described.

Figure 29:
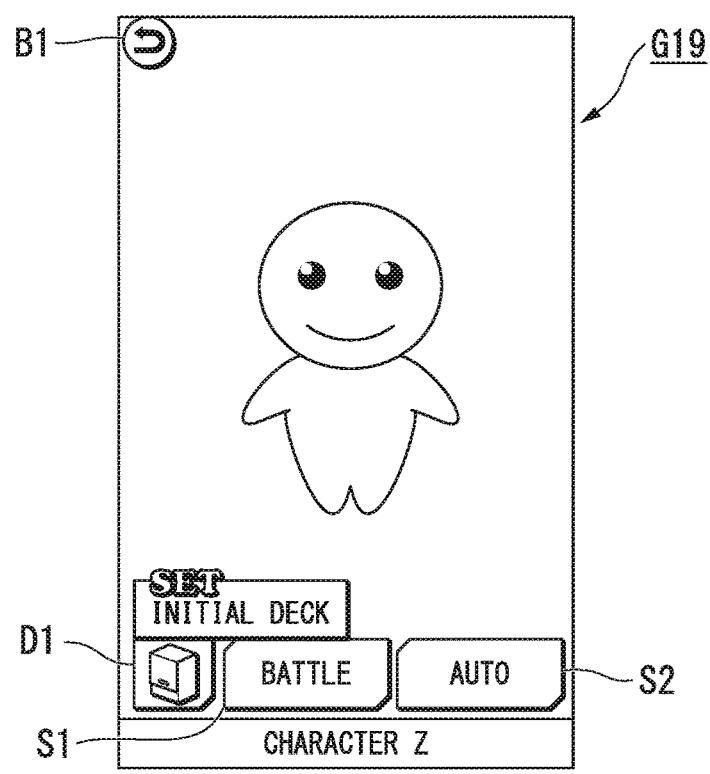
FIG. 29 is a diagram showing a quest confirmation screen according to a normal quest according to an embodiment.

FIG. 29 is a diagram showing a quest confirmation screen with respect to normal quests.

In the example shown in FIG. 29, the deck setting button D1, the battle button S1 and an auto button S2 are provided on the quest confirmation screen G19. That is, the quest selection screen with respect to normal quests differs from the quest confirmation screen with respect to rare quests in that the reward confirmation button R1 is omitted and the auto button S2 is newly provided. For example, transition from a quest selection icon of a normal quest to the quest confirmation screen G19 can occur.

The auto button is an operator for causing a battle constituting a quest to proceed according to auto play. Auto play is a function of the game system 1 to simulate game operations of users to progress a main game. That is, a user can acquire a battle result without inputting game operations in the case of auto play.

In the present embodiment, difficulty levels of rare quests are relatively higher than those of normal quests. In this case, advanced strategic properties are not required for normal quests in many cases. Accordingly, the auto button is provided in the case of the quest confirmation screen with respect to normal quests to improve user convenience.

In addition, in the present embodiment, rewards of rare quests are superior to those of normal quests as an example. In this case, it is conceivable that user requirements for confirming the details of a reward are further higher in the case of rare quests than in the case of normal quests. Accordingly, the reward confirmation button R1 is omitted in the case of the quest confirmation screen with respect to normal quests. However, the reward confirmation button R1 may be provided on the quest confirmation screen with respect to normal quests.

[Game Screen: Reward Confirmation Screen]

Next, the reward confirmation screen will be described.

Figure 30:
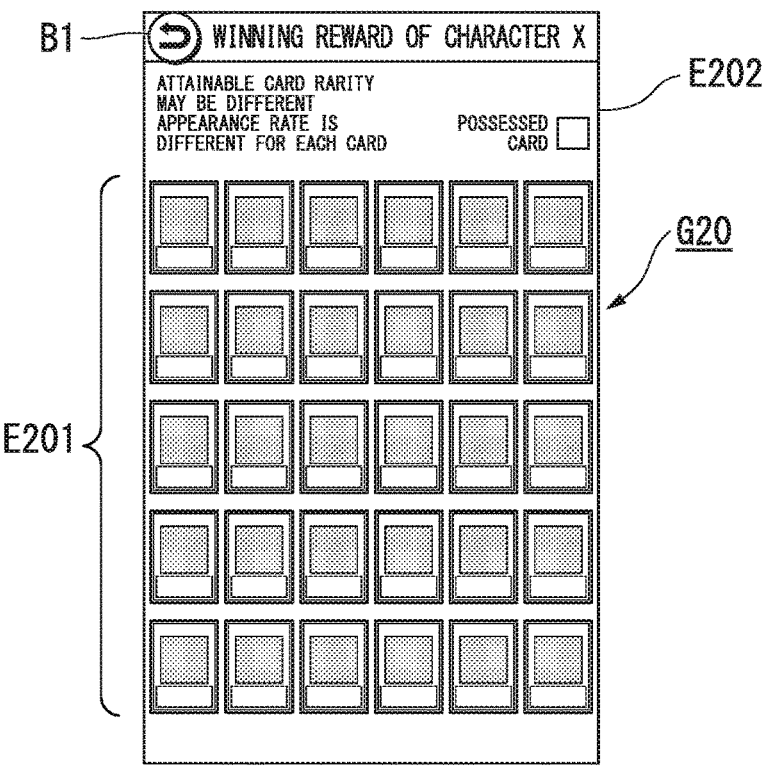
FIG. 30 is a first diagram showing a reward display screen according to an embodiment.
Figure 31:
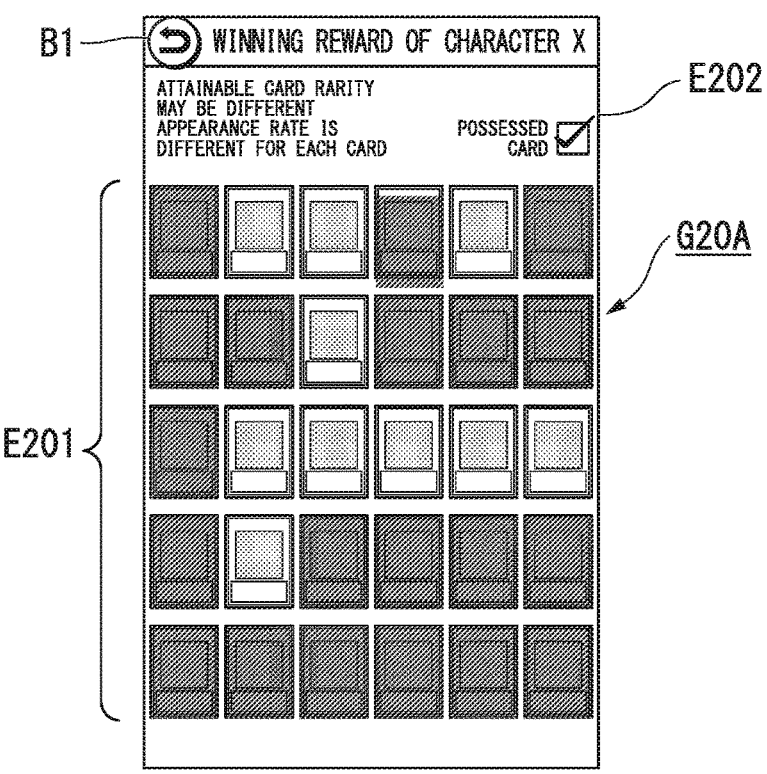
FIG. 31 is a second diagram showing a reward display screen according to an embodiment.

FIG. 30 and FIG. 31 are diagrams showing reward display screens.

The reward display screen displays rewards of quests. For example, transition from the quest confirmation screen to the reward display screen can occur.

In the example shown in FIG. 30, a reward display section E201 and a possessed card check button E202 are provided on the reward display screens G20 and G20A.

The reward display section displays rewards that are likely to be given when a quest is achieved. For example, the reward display section displays images of rewards, the number of rewards, probabilities that rewards are given, and the like as a list.

The possessed card check button is an operator for switching display modes of the reward display section according to presence or absence of possession of a user. In the case of the example shown in FIG. 30, the possessed card check button E202 is disabled. In this case, the display mode of each reward does not depend on whether the user possesses it. On the other hand, the possessed card check button E202 is enabled in the case of the example shown in FIG. 31. In this case, respective rewards are displayed in different display modes according to whether the user possesses them. Specifically, a reward possessed by the user is displayed in a grayed out state. Accordingly, the game system 1 can highlight rewards that are not possessed by the user. Therefore, the user can easily determine whether a desired reward can be acquired.

The reward confirmation screen has been described above.

[Game Screen: Deck Setting Screen]

Next, a deck setting screen will be described.

Figure 32:
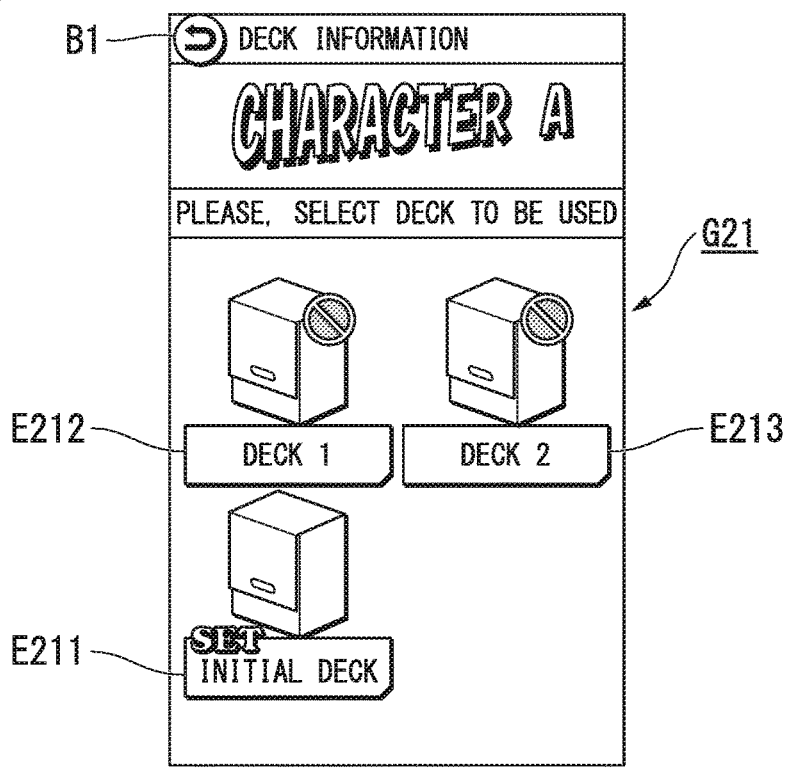
FIG. 32 is a diagram showing a deck selection screen according to an embodiment.

FIG. 32 is a diagram showing a deck setting screen.

The deck setting screen is a screen through which a deck used for a battle is selected (set). For example, transition from a quest confirmation screen to the deck setting screen can occur.

In the example shown in FIG. 32, three deck icons of a first deck icon E211, a second deck icon E212 and a third deck icon E213, are provided on the deck setting screen G21. Although three deck icons are shown as an example here, the number of deck icons may be arbitrarily set.

The deck icon is an image corresponding to a deck. In the case of the example shown in FIG. 32, the first deck icon E211 corresponds to a first deck, the second deck icon E212 corresponds to a second deck and the third deck icon E213 corresponds to a third deck.

In addition, the deck icon is an operator for selecting a deck used for a battle. A user can select a deck icon to use a deck corresponding to the selected deck icon for a battle.

Meanwhile, the game system 1 may change a display mode of deck icons according to deck selection states, availability of decks or the like. For example, in the case of the example shown in the deck setting screen G21, the game system 1 displays a text of "SET" on the first deck icon E211 because the first deck has been selected. Further, since the second deck and the third deck cannot be used in the current card arrangement, the game system 1 displays a mark indicating unavailability on the second deck icon E212 and the third deck icon E213.

The deck selection screen has been described above.

[Game Screen: Battle Result Screen]

Next, a quest result screen will be described.

The quest result screen is a screen showing a result of a quest. The quest result screen is displayed after a quest ends.

Figure 33:
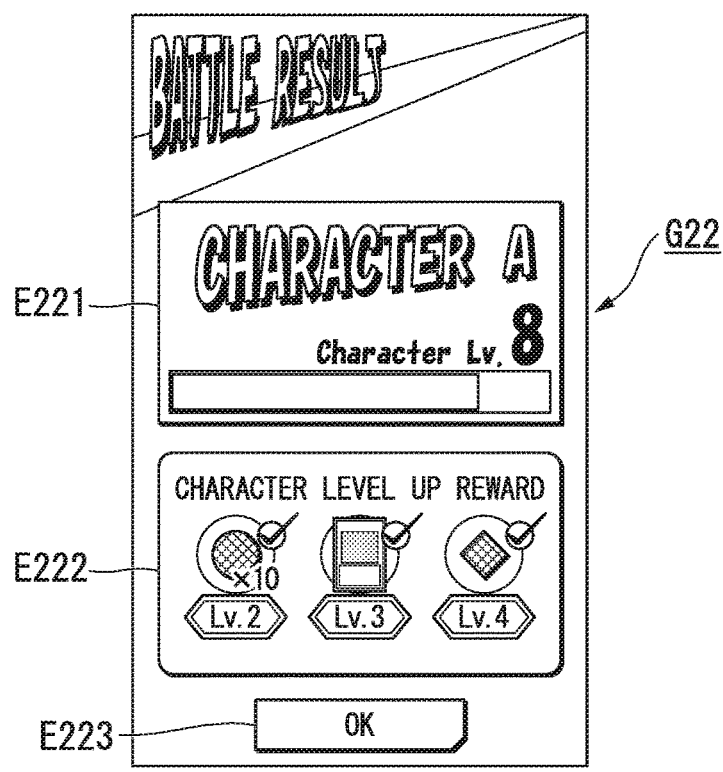
FIG. 33 is a diagram showing a quest result screen according to an embodiment.

FIG. 33 is a diagram showing a quest result screen.

In the example shown in FIG. 33, a player character level display section E221 and a reward display section E222 are provided on the quest result screen G22.

The character level display section displays a change in a character level according to a result of a quest. For example, the player character level display section displays a character level and a change in a parameter (e.g., experience value) with respect to a change in the character level. Meanwhile, a player level may be changed as a result of a quest.

The reward display section displays a reward given as a result of a quest. The reward display section displays a reward according to achievement of a quest. Further, the reward display section may display a reward indirectly given according to a parameter changed according to a result of a quest. For example, the game system 1 may display, in the reward display section, a reward associated with a character level of a player character in advance according to an increase in the character level as a result of a quest.

The quest result screen has been described above.

[Overview of Battle Part]

Next, the overview of an example of a battling game executed in a battle part will be described.

In the present embodiment, a game executed in a battle part is a so-called trading card game (hereinafter, referred to as a "card game") played using a plurality of cards possessed by a user. For example, this card game is a battling card game in which a battle is executed using cards combined from a plurality of cards possessed by a user according to a predetermined rule and proceeds in such a manner that the user and an opponent alternately perform selection of cards and selection of commands for executing processes with respect to cards. Meanwhile, the opponent may be a non-player character (NPC) controlled by a computer or may be a user of another terminal device 10. Further, a deck used by an NPC may be a deck set in advance or a deck possessed by a user of another terminal device 10. In addition, the number of selection operations alternately performed by the user and the opponent may be the same or different. For example, a method may be employed in which the user and the opponent alternately perform the selection operations once per turn or a method may be employed in which, when the user performs selection operation twice, the opponent takes his/her turn (hereinafter, referred to as a "turn") and performs the selection operation three times, and then the user takes his/her turn. Further, the number of times of selecting a command is not limited and may be zero, for example.

Here, a command represents a process in progress of a game. A process to be executed is determined in such a manner that a user selects an operator corresponding to a command during play of a game and selects a card that is a target on which a process based on the command corresponding to the selected operator is executed.

For example, in a card game, an operator corresponding to a command is a choice for selecting a process to be executed with respect to a card selected by a user or a card that will be selected by the user henceforth. When the user selects an operator corresponding to a command and selects a card, a process to be executed with respect to the selected card is determined. Specifically, when the user selects an operator corresponding to a command and selects a card on which a process based on the command corresponding to the selected operator will be executed, the process based on the command corresponding to the selected operator is executed with respect to the selected card to progress the game. For example, when the user selects an operator corresponding to a call command, which is an operator corresponding to a command with respect to a process of arranging a specific card in a field, and selects a card that is a target to be called, the selected card is disposed in the field. The field is an area in which the user arranges cards.

Meanwhile, execution of a process based on a command may be reworded as execution of a command. Further, selection of an operator corresponding to a command may be reworded as selection of a command. In the following description, a command icon corresponding to each command, a pop-up menu displaying a list of commands, and the like function as operators corresponding to commands and are displayed on game screens such that the user can select them, for example.

Figure 34:
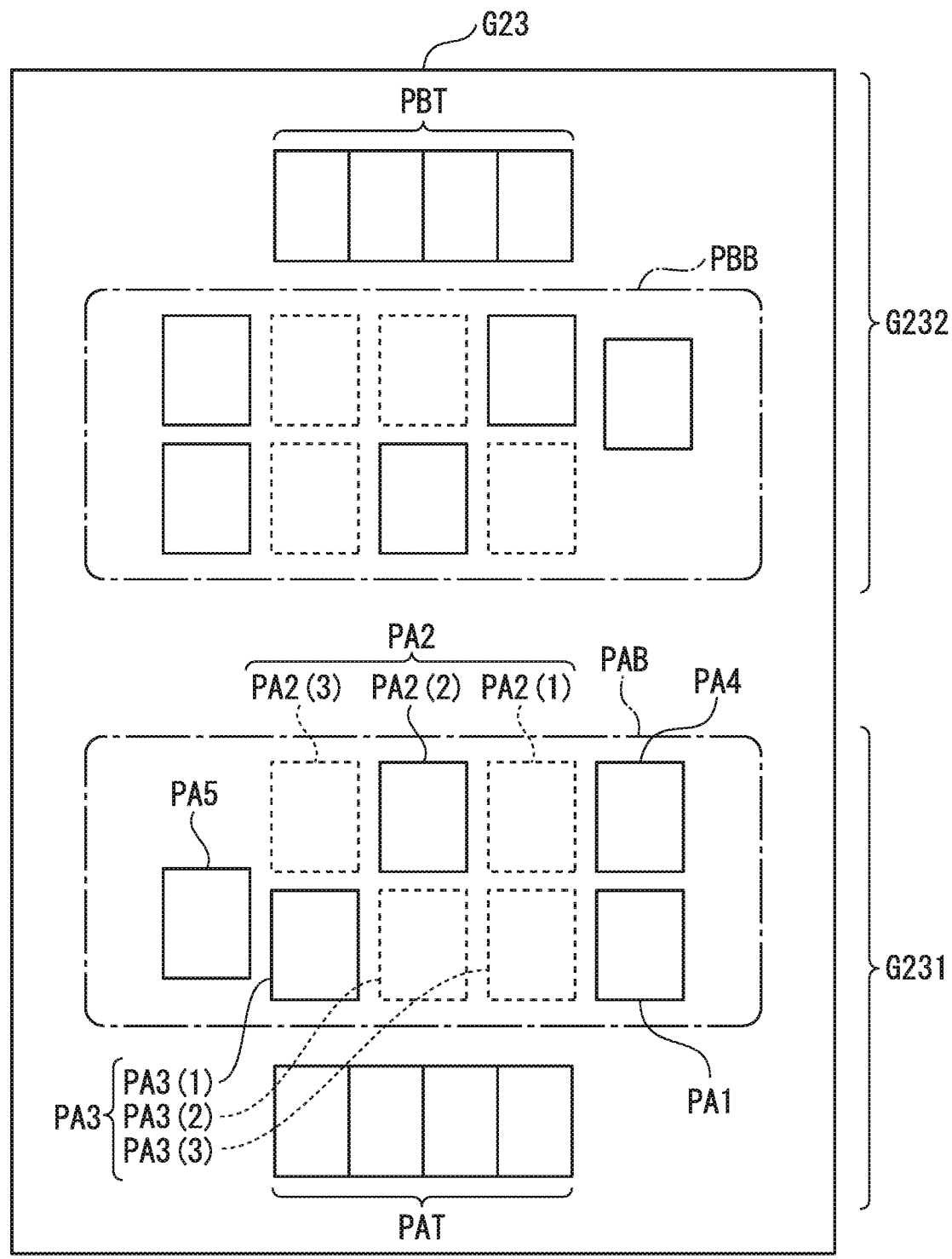
FIG. 34 is a diagram showing a game progress screen according to an embodiment.

FIG. 34 is a diagram showing an example of a game progress screen of a card game.

In the example shown in FIG. 34, the game progress screen G23 is an example of a game screen displayed on the in-terminal display device 13 when a card game is executed in the game system 1. A user's own hand (hereinafter, referred to as an "own hand PAT") indicated by a sign PAT and a user's own field (hereinafter, referred to as an "own field PAB") indicated by a sign PAB are displayed in a lower half area G231 of the game progress screen G23. On the other hand, an opponent's hand (hereinafter, referred to as an "opponent hand PBT") indicated by a sign PBT and an opponent's field (hereinafter, referred to as an "opponent field PBB") indicated by a sign PBB are displayed in an upper half area G232. The own hand PAT and the own field PAB and the opponent hand PBT and the opponent field PBB are displayed in a face-to-face manner. Cards of the user and cards of the opponent are disposed and displayed in the own hand PAT and the own field PAB and the opponent hand PBT and the opponent field PBB. Meanwhile, arrangement and display of cards on a game screen may also be simply referred to as arrangement of cards.

As described above, this card game is a turn-type battling game in which a user and an opponent alternately perform their turns, the user performs selection of a card and selection of a command in his/her turn and the opponent performs selection of a card and selection of a command in his/her turn.

First, the user prepares a deck that is a deck (a bundle, a package or a set) of cards composed of a predetermined number of (about 40) possessed cards, which is obtained by arbitrarily combining the cards, and arranges the plurality of cards included in the deck in a random order such that they face down in the own field PAB as a stock of cards. Specifically, the stock is disposed in an area PA1 in the own field PAB. Subsequently, a predetermined number (e.g., 5) of cards drawn by the user from the stock of cards in a random order in his/her turn become hands. These hands are disposed in the own hand PAT. Here, cards disposed in the own hand PAT are disposed with the front sides thereof facing upward so that the user can visually recognize the front sides on which card types and parameters are described. On the other hand, cards disposed in the opponent hand PBT are disposed with the rear sides thereof facing upward so that the user cannot visually recognize the front sides of the cards. In addition, from the second and following turns, the user can draw one card from the stock in each turn and use it in a hand.

The user plays the game in such a manner that the user shows the effects of cards by moving the cards from the own hand PAT to the own field PAB and the like or compares cards placed in advance in the own field PAB with cards in the opponent field PBB. Each of the user and the opponent initially has predetermined life points (LP: 8000, for example), and each of the user and the opponent reduces the LPs of each other according to a predetermined rule on the basis of details of card selection and details of command execution, and the party that reduces the LPs of the other party to 0 wins the game.

Meanwhile, moving a card from the own hand PAT to the own field PAB is referred to here as calling. Card types include a monster card, a magic card, a trick card and the like. Further, in the following, the magic card and the trick card may be referred to as a magic/trick card when they are not particularly distinguished from each other.

A place in which cards can be disposed according to calling within the own field PAB is set according to card type. An area PA2 is a place in which a monster card can be disposed (hereinafter, referred to as a "monster area"). This area PA2 includes three areas PA2 (1), PA2 (2) and PA2 (3) in which monster cards can be respectively disposed, and a maximum of three monster cards can be simultaneously disposed therein. In the example shown in FIG. 34, the monster card is disposed only in the area PA2 (2) among the areas PA2 (1), PA2 (2) and PA2 (3). In addition, an area PA3 is a place (hereinafter, referred to as a "magic/trick area") in which a magic card and a trick card can be disposed. This area PA3 includes three areas PA3 (1), PA3 (2) and PA3 (3) in which magic cards or trick cards can each be disposed, and a maximum of three magic and/or trick cards can be simultaneously disposed therein. In the example shown in FIG. 34, the magic card or the trick card is disposed only in the area PA3 (3) among the areas PA3 (1), PA3 (2) and PA3 (3). Further, an area PA4 is a place (hereinafter, referred to as a "graveyard") in which a monster card destroyed by an attack or a used monster card and trick card are disposed. In addition, an area PA5 is a place (hereinafter, referred to as an "extra area") in which a card is disposed that can be specially called through a special method.

Next, each card will be described.

For the monster card, parameters such as offense power that is referred to when a process based on an attack command which will be described later is performed and defense power that is referred to when an opponent performs a process based on the attach command are set. In addition, the monster card includes a monster card having the effect of being capable of advantageously performing battles by executing processes based on a monster effect command which will be described later and a monster card that does not have the effect.

The magic/trick card provides the effects of executing a specific process, limiting a process that an opponent intends to execute and changing card parameters by performing processes based on a magic/trick command which will be described later. Various effects and execution conditions are set according to card types and effect types. Examples of effects include increasing offense power of the monster card, adding a top card of a stock to a hand, limiting execution of a command of an opponent, and the like. Examples of execution conditions include a difference between LPs of a user and an opponent, the number of monster cards in a field, and the like.

Next, commands used by a user when the user selects cards will be described.

Command types include call, offense/defense change, magic/trick, monster effect, special calling, attack, and the like.

The call command is a command with respect to a process of arranging a specific card in a field. A user arranges selected monster cards or monster cards to be selected henceforth in the own field PAB by executing a process based on the call command. Further, when monster cards are disposed, an arrangement direction such as a vertical direction, a horizontal direction, a direction in which front sides of cards face upward, a direction in which front sides of cards face downward, or the like may be selected. For example, a monster card disposed in the vertical direction with the front side thereof facing upward can be used to make an attack. A monster card disposed in the horizontal direction with the front side thereof facing upward cannot be used to make an attack but an LP thereof does not decrease even when attacked by an opponent. The details of a card disposed with the rear side facing upward are not recognized by an opponent. For example, an arrangement of a monster card in a field with the front side facing upward may be referred to as facing upward calling and an arrangement with the front side facing downward may be referred to as facing downward calling.

The offense/defense change command is a command for changing a direction of arrangement (vertical direction, horizontal direction, facing upward direction, facing downward direction or the like) of monster cards present in a field. When a user executes a process based on the offense/defense command, a direction of arrangement when the user arranges a selected monster card or a monster card to be selected henceforth now in the own field PAB is changed.

The magic/trick command is a command for presenting effects associated with a magic/trick card. Presenting an effect refers to executing a process associated with the effect. When a user executes a process based on the magic/trick command, effects associated with a selected magic/trick card or a magic/trick card to be selected henceforth now are presented.

The monster effect command is a command for presenting a predetermined effect associated with an effective monster card. When a user executes a process based on the monster effect command, a predetermined effect associated with a selected monster card or a monster card to be selected henceforth is presented.

The special call command is a command available when execution conditions (conditions associated with cards) at satisfied which are different from facing upward calling and facing downward calling and is a command for arranging a monster card in a field.

The attack command is a command for attacking an opponent using a monster card. A user attacks an opponent according to a selected monster card or a monster card to be selected henceforth by executing a process based on the attack command.

Execution conditions that allow a process based on a command to be executable according to battle states are set for each of these commands. Battle states refer to various requirements during play of a game such as whether any of a user and an opponent takes his/her turn, an LP of each of the user and the opponent, the number of hands, the number of remaining stocks, the number of monster cards in a field, the number of monster cards in a graveyard, a current phase during a turn, an elapsed time from start of a turn, an elapsed time from when a command can be selected, and the like. A phase is a section in a rule during each turn. Although the present card game is played in such a manner that a user and an opponent alternately repeat their turns, one turn is composed of a plurality of phases.

Figure 35:
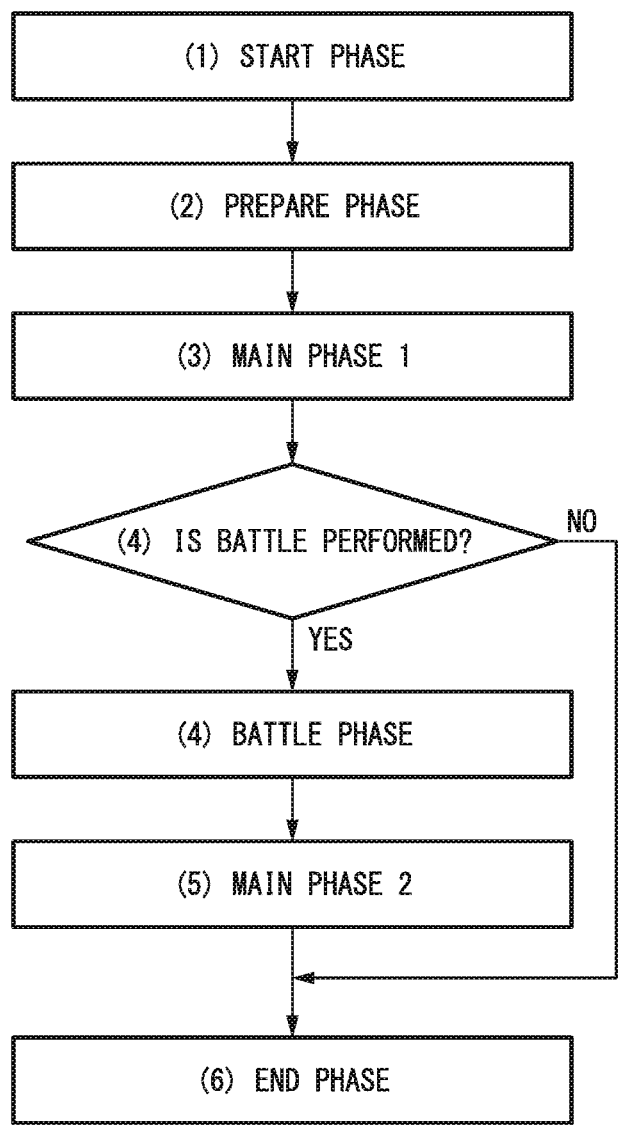
FIG. 35 is a diagram showing a flow of one turn in a card game according to an embodiment.

FIG. 35 is a diagram showing an example of a flow of one turn played by a user.

For example, one turn proceeds in the order of phases (1) to (6) shown in FIG. 35.

(1) Start phase: A turn is started and a process of drawing a card from a stock is performed.

(2) Preparation phase: Effects automatically generated at this timing are processed.

(3) Main phase 1: A user selects a command and a card to perform processes with respect to presentation of effects according to calling of a monster card, magic/trick, monster effects and the like.

(4) Battle phase: This is started by an operation of a user to perform a battle, an attack to an opponent is performed using cards disposed in a field, and an attack result is processed. Meanwhile, when a battle is not performed, this battle phase is not performed and the flow proceeds to (6) end phase described below.

(5) Main phase 2: The same process as main phase 1 is performed only when the battle phase of (4) has been performed. Meanwhile, this phase may be omitted.

(6) End phase: A process of ending the turn is performed. Thereafter, the flow moves to a turn of the opponent.

For example, commands such as calling and offense/defense change are executable only in the main phases. On the other hand, the attack command is executable only in the battle phase. In addition, execution conditions for each command are also set according to battle states other than phases. For example, the call command is executable when a monster card is in the own hand PAT and is not executable when there is no monster card therein. The offense/defense change command is executable when a monster card is in the own field PAB and is not executable when there is no monster card therein. The monster effect command is executable when an effective monster card is in the own hand PAT or in a stock or a graveyard of the own field PAB and is not executable when there is no effective monster card therein. The magic/trick command is executable when a magic/trick card is in the own hand PAT or the own field PAB and is not executable when there is no magic/trick card therein. The special call command is executable when a monster card corresponding to special call conditions, which cannot be called through a normal method, is in the own hand PAT or the own field PAB (area PA5) and is not executable when such a monster card is not present therein. The attack command is executable when a monster card is in the own field PAB and is not executable when there is no monster card therein. In addition, the attack command is executable only once per turn with respect to each monster card. Meanwhile, the conditions in which processes based on such commands are executable are an example and various conditions may be set according to the type of each card, a relationship between a user's own LP and an opponent LP with respect to size, whether the user takes his/her turn or the opponent takes his/her turn, and the like.

The overview of a battling type game executed in a battle part has been described above.

[Overview of Data Configuration]

Next, the overview of data configuration of various types of data managed by the game system 1 will be described.

First, card data will be described.

FIG. 36 is a diagram showing an example of card data.

In the example shown in FIG. 36, the card data is configured by associating a card ID, card name information, card type information, level information, offense power information, defense power information, card text information, effect information, version information and image information with one another.

The card name information is information representing the name of a card.

The card type information is information representing the type of the card.

The level information, the offense power information, the defense power information, the card text information and the effect information are information representing card parameters in a game.

The version information is information representing classification (version) of the card according to when the card initially appeared, and the like.

The image information is information representing an image of the card.

Accordingly, the terminal device 10 and the server device 30 can identify the name, type, parameter, version, image and the like of each card by referring to card data.

Card attribute information has been described above.

Next, deck data that describes a deck will be described.

FIG. 37 is a diagram showing an example of deck data.

In the example shown in FIG. 37, the deck data is configured by associating a frame ID with a card ID. In addition, deck data is described for each deck although it is not shown. Specifically, deck data is associated with a deck ID and stored. A deck ID is information for identifying a deck.

A frame ID is information for identifying a frame in a deck. A frame represents the order or arrangement of cards that constitute a deck. For example, frames of "1" to "32" are represented and cards are respectively associated with the frames in the example shown in FIG. 37. In the example shown in FIG. 37, the frame ID describes the usage of a frame in a format in which it can be identified, such as "main," mainly used during play, "side," used as backup, or the like. When a frame is associated with a card in this manner, the terminal device 10 and the server device 30 can faithfully reproduce a deck by referring to deck data even if the order, arrangement and the like of cards in the deck have game properties.

Meanwhile, supplementary information such as a memo of a deck editor (creator) and a deck record may be associated with a deck ID and stored in addition to attribute information such as the name of a deck and the creation date and time of the deck.

The deck data has been described above.

Next, user data will be described.

FIG. 38 is a diagram showing an example of player data.

In the example shown in FIG. 38, user data is configured by associating a player ID, player level information, first game money information, second game money information, monthly charging amount information and age authentication information with one another.

The player level information is information representing a player level.

The first game money information is information representing the amount of first in-game money possessed by a user. An amount purchased by a user and an amount acquired according to progress of a game in the first in-game money may be separately described in the first game money information.

The second game money information is information representing the amount of second in-game money possessed by a user.

The monthly charging amount information is information representing the amount of money charged by a user for a game.

The age authentication information is information representing an authentication result of the age of a user. An upper limit of the monthly charging amount of the user may be set on the basis of this authentication result.

Accordingly, the terminal device 10 and the server device 30 can identify how much each user plays games by referring to user data.

The user data has been described above.

Next, appearance rule data will be described.

The appearance rule data describes an appearance rule of appearance control icons. Here, an example of appearance rule data of quest selection icons will be described as an example.

FIG. 39 is a diagram showing an example of appearance rule data of quest selection icons.

In the example shown in FIG. 39, the appearance rule data is configured by associating quest type information, appearance interval information, appearance probability information and appearance object information with one another.

The quest type information is information representing the type of a quest.

The appearance interval information is information representing a time interval at which it is determined whether to cause a quest selection icon to appear.

The appearance probability information is information representing a probability at which a quest selection icon is caused to appear.

The appearance object information is information representing a population when a quest to appear is selected.

Accordingly, the terminal device 10 and the server device 30 can cause quest selection icons of various quests to appear at each time interval indicated by the appearance interval information with a probability indicated by appearance frequency information by referring to the appearance rule data.

The appearance rule data has been described above.

Modified Examples

Although embodiments of the present invention have been described in detail with reference to the drawings, specific components are not limited to the above-described embodiments and may have designs and the like in a range that does not depart from the scope of the present invention. For example, components described in the above-described first embodiment may be arbitrarily combined. Further, for example, each component described in the above-described first embodiment can be omitted when it is not necessary to produce a specific function.

Further, in the above-described embodiments, quests that can be played through the rare quest selection screen may be the same as or different from quests that can be played through the quest selection icons. For example, rare quests that can be played only through the rare quest selection screen may be set or rare quests that can be played only through the quest selection icons may be set.

Moreover, in the above-described embodiments, rewards may be rearranged (sorted) or a display mode may be changed by designating arbitrary conditions in addition to presence or absence of possession of rewards of a user. Rewards to be displayed may be sorted in descending order or ascending order according to the prices of the rewards or the number of possessed rewards. In addition, a display mode may be distinguishably changed through an arbitrary method such as changing colors, changing transparency, exclusion from display objects or adding a mark in addition to grayout.

Further, an appearance rule for appearance control icons is not limited to the above-described appearance rule. For example, the game system 1 may cause appearance control icons to appear according to a predetermined schedule. A schedule is information in which an appearance control icon has been associated with an appearance timing. In this case, the game system 1 selects any one of a plurality of schedules when a game is started, for example. Then, the game system 1 causes appearance control icons to sequentially appear with the elapse of time according to the selected schedule. In addition, orders of all or a part of appearance objects, appearance timings and appearance frequencies (appearance time intervals and appearance probabilities) may be predetermined as an appearance rule. As appearance objects, types and attributes of quests, traders, and dropped articles may be set in addition to the quests, traders, and dropped articles. For example, a quest appearance order, quests to appear, an appearance timing change order, and the like may be set as appearance rules.

Moreover, although a case in which there are a normal quest and a rare quest as quest types has been described in the above-described embodiment, the present invention is not limited thereto. For example, an event quest different from the normal quest and the rare quest may be present. The event quest is an event that is associated with a predetermined process only when predetermined event conditions are satisfied. For example, a condition in which the terminal device 10 is in a predetermined event period, a condition in which a predetermined parameter is a predetermined value, and the like may be applied as the predetermined event conditions. Specifically, a quest that is controlled to appear like a normal quest only in a predetermined event period and a quest associated with a predetermined reward only in a predetermined event period may be set as event quests.

Further, a reward may be given according to achievements of a plurality of quests as well as achievement of only one quest in the above-described embodiment. That is, a reward may be given according to achievement of a quest group composed of a plurality of quests. For example, the game system 1 may give a user a reward according to achievements of a plurality of predetermined quests in a predetermined order.

In addition, although a case in which a player level is associated with information relating to a quest appearance rule, game objects, game parts and the like has been described in the above-described embodiment, the present invention is not limited thereto. For example, a character level may be associated with information relating to a quest appearance rule, game objects, game parts and the like.

Further, although a case, in which an appearance state of appearance control icons is changed when a player level is increased, has been described in the above-described embodiment, the present invention is not limited thereto. For example, an appearance state of appearance control icons is changed when a character level is increased.

In the above-described embodiment, secondary games constituting quests are not limited to battling type games. For example, quests may be configured using games such as catching games, shooting games, sports games, slot games, competition games, arranging games, battle games, quiz games, memory games and card games.

Catching games are games in which a target object displayed as a target is captured, for example. Shooting games are games in which a target object is shot down, for example. Sports games are games that simulate sports such as hitting a target object with a bat, a racket and the like, for example. Slot games are games in which a reward is given on the basis of a combination of symbols stopped and displayed by performing an operation of stopping a plurality of rotating reels, for example. Competition games are games in which specific competition objects (cars, horses or the like) are operated to compete for ranking, for example. Arranging games are games that require an operation of adjusting positions and inclinations of a plurality of objects (blocks or the like), for example. Battle games are games in which attack and defense are performed to compete for winning or losing with an opponent, for example. Quiz games are games for inquiring about knowledge, calculation ability, figure recognition ability and the like, for example. Memory games are games in which a user's memory is tested with respect to temporarily presented information and the like, for example. Card games are games that require strategic properties such as choice of cards, for example.

In addition, processes of the terminal device 10 and the server device 30 may be performed by recording a program for realizing the above-described functions of the terminal device 10 and the server device 30 in a computer-readable recording medium and causing a computer system to read and execute the program recorded in the recording medium. Here, "causing a computer system to read and execute a program recorded in a recording medium" includes installing the program in the computer system. Here, the "computer system" may include an OS, hardware of peripheral devices, and the like. In addition, the "computer system" may include a plurality of computer devices connected through a network including a communication line such as the Internet, a wide area network (WAN), a local area network (LAN) or a dedicated line. Further, the "computer-readable recording medium" refers to a potable medium such as a flexible disk, a magneto-optical disk, a ROM or a CD-ROM, or a storage device such as a hard disk embedded in a computer system. In this manner, a recording medium in which a program is recorded may be a non-transient recording medium such as a CD-ROM. In addition, a recording medium also includes an internally or externally provided recording medium accessible through a distribution server for distributing a corresponding program. Program code stored in a recording medium of a distribution server may be different from program code in a format executable in a terminal device. That is, program code may be stored in the distribution server irrespective of a format stored therein if the program code can be downloaded from the distribution server and installed in a format in which it can be executed in a terminal device. Meanwhile, a configuration in which a program is divided into a plurality of programs, downloaded at different timings, and then integrated in a terminal device may be employed or different servers may respectively distribute divided programs. Further, the "computer-readable recording medium" may include a medium that saves a program for a predetermined time, such as a volatile memory (RAM), in a computer system that is a server or a client when a program has been transmitted through a network. In addition, the aforementioned program may be a program for realizing a part of the above-described functions. Further, the aforementioned program may be a program capable of realizing the above-described functions according to a combination with a program that has already been recorded in a computer system, so-called difference file (difference program).

Furthermore, some or all of the above-described functions of the terminal device 10 and the server device 30 may be realized as an integrated circuit such as an LSI circuit. The above-described functions may be individually realized as processors or some or all thereof may be integrated and realized as a processor. In addition, the integration method is not limited to LSI, and the functions may be realized as a dedicated circuit or a general-purpose processor. Further, when a circuit integration technology replacing LSI appears with the advance of semiconductor technology, integrated circuits according to the technology may be used.

A plurality of aspects of the present invention are acquired as follows from the above disclosure, for example. Meanwhile, the plurality of aspects of the present invention are not limited to the illustrated aspect.

One aspect of the present invention is a terminal device 10 including a controller 160 which generates a game screen capable of displaying first game objects associated with a first reward in a game and second game objects associated with a second reward in the game, a display device 13 which displays the game screen generated by the controller, and an input device 12 which receives an operation of selecting a first game object and an operation of selecting a second game object, wherein the controller increases at least one of the number of selectable first game objects and the number of selectable second game objects at a predetermined frequency and changes at least one of the number of selectable first game objects and the number of selectable second game objects according to a decrease in the number of items associated with the user when a number relating to at least one of the number of selectable first game objects and the number of selectable second game objects is less than a predetermined number depending on a predetermined parameter value associated with the user.

According to the aforementioned configuration, the terminal device changes an upper limit of the sum of the number of selectable first game objects and the number of selectable second game objects, for example, by changing a predetermined parameter value associated with the user, such as a player level, for example. In addition, the terminal device changes at least one of the number of selectable first game objects and the number of selectable second game objects in exchange for consumption of an item possessed by the user, for example. Accordingly, the terminal device can add strategic properties to the game with respect to causing the first game objects and the second game objects to be selectable.

Another aspect of the present invention is a terminal device 10 including a controller 160 which generates a game screen including first game objects associated with a first game part in a game and capable of displaying second game objects associated with a second game part in the game, a display device 13 which displays the game screen generated by the controller, and an input device 12 which receives an operation of selecting a first game object and an operation of selecting a second game object, wherein the controller increases the number of selectable second game objects at a predetermined frequency when the number of selectable second game objects is less than a predetermined number depending on a predetermined parameter value associated with a user.

According to the aforementioned configuration, the terminal device changes the number of selectable second game objects on the game screen including first game objects. Accordingly, the user visually recognizes first game objects in a process of searching selectable second game objects. Therefore, the terminal device can guide the user to the first game part with high efficiency. In addition, the terminal device changes an upper limit of the number of selectable second game objects, for example, by changing a predetermined parameter value associated with the user, such as a player level, for example. Accordingly, the terminal device can motivate the user to continue the game.

Another aspect of the present invention is a terminal device 10 including an input device 12 which receives an operation of selecting a part of a virtual space in a game and an operation of selecting a game object associated with a reward in the game and arranged in the virtual space, a controller 160 which generates a game screen including a part of the virtual space on the basis of an operation received by the input device, and a display device 13 which displays the game screen generated by the controller, wherein the controller controls appearance of the game object in the virtual space such that the number of selectable game objects becomes equal to or less than a predetermined number.

According to the aforementioned configuration, the terminal device controls appearance of selectable game objects in the entire virtual space instead of in devices of each game screen. Thus, the user needs to switch game screens in order to check all selectable game objects. Accordingly, the terminal device can enhance a user's interest in switching game screens and searching selectable game objects.

Another aspect of the present invention is a terminal device 10 including a controller 160 which generates game screens in a game, a display device 13 which displays the game screens generated by the controller, and an input device 12 which receives an operation of switching game screens displayed by the display device from a first game screen to a second game screen and an operation of selecting a game object associated with a reward in the game and arranged on a game screen displayed by the display device, wherein the controller controls appearance of the game object such that the number of game objects selectable through at least one of the first game screen and the second game screen becomes equal to or less than a predetermined number.

According to the aforementioned configuration, the terminal device controls the number of game objects selectable through at least one of the first game screen and the second game screen. Thus, a user needs to switch at least the first game screen and the second game screen in order to check all selectable game objects. Accordingly, the terminal device can enhance a user's interest in switching game screens and searching selectable game objects.

Another aspect of the present invention is a game system 1 including a display device 13 which causes at least one of first icons C1 and C2 to appear and displays the at least one of the first icons C1 and C2 in at least one of a plurality of areas, an input device 12 which receives an operation of switching the areas and an operation of selecting a first icon, and controllers 160 and 330 which control a game corresponding to the selected first icon such that the game can be played when any of the first icons is selected in the switched areas, wherein the controllers limit the number of first icons caused to appear to an upper limit value or less.

According to the aforementioned configuration, since first icons appear in a plurality of areas, a user can play a game corresponding to a first icon by detecting and selecting the first icon. On the other hand, the game system limits the number of first icons to the upper limit value or less, and thus it is possible to prevent the number of first icons from excessively increasing and prevent detection of a first icon from becoming valueless. For example, the game system can allow the user to be interested in detecting a number of first icons limited to the upper limit value or less from a plurality of areas.

Meanwhile, when areas are switched, the display device switches entire screens (headers or footers may be excluded, for example) (presentation such as switching screens is included).

According to another aspect of the present invention, in the aforementioned game system, the display device causes a second icon C3 of a type different from the first icons C1 and C2 to appear and displays the second icon C3, and the controller limits the number of icons caused to appear to an upper limit value or less for each icon type.

According to the aforementioned configuration, a number of first icons, which is equal to or less than the upper limit value, and a number of second icons, which is equal to or less than the upper limit value, appear in a plurality of areas. A user can play a game corresponding to a first icon by detecting and selecting the first icon and enjoy an event or the like corresponding to a second icon. For example, the game system 1 can allow the user to be interested in detecting a number of first icons and a number of second icons, which are limited to the upper limit value or less, from a plurality of areas.

According to another aspect of the present invention, in the aforementioned game system, the display device causes the second icon C3 to appear and displays the second icon C3 in at least one of the plurality of areas, and the controller controls the number of first icons C1 and C2 and the number of second icons on the basis of a predetermined rule, and when a second icon is selected, provides a game value corresponding to the selected second icon.

According to the aforementioned configuration, since a predetermined number of second icons appear in a plurality of areas, a user can obtain a game value by detecting and selecting a second icon. In addition, the user can obtain an item, in-game money, a card and the like by selecting a second icon and thus does not lose an interest in the game. That is, the game system can motivate the user to continue the game.

According to another aspect of the present invention, in the aforementioned game system, the controller controls whether to cause appearance of a third icon C4 linked to an exchange screen through which a specific game object is selected and can be exchanged according to value in the areas on the basis of a predetermined rule.

According to the aforementioned configuration, the third icon may appear or may not appear and is not always disposed. For example, the game system can allow the user to be interested in detecting a timing at which the third icon appears or an area in which the third icon appears.

Here, a game object may be a card, a medal (coin), a figure, or an image representing a character or an item. A character, an item or the like represented by a game object is used in a game. For example, an ability, a state, an effect, a skill, a special skill, a weapon or magic may be set for each of such characters and items, and these settings are used in a game. In addition, a game object is possessed by one or a plurality of users. Further, a plurality of game objects are registered as a set of game objects such as a deck, a party or a team, for example. A user plays a game using characters, items or the like represented by game objects of each set as a group or supports a set for which a game will be played (provides skills, supports an ability or a state (enhances an ability parameter) or provides weapons or magic).

According to another aspect of the present invention, in the aforementioned game system, the display device arranges and displays a fourth icon E111 linked to a purchase screen through which a game object E151 can be purchased in a specific area, and the controller controls whether to cause appearance of the third icon C4 linked to an exchange screen G16 through which a specific game object is selected and can be exchanged according to value in the area on the basis of a predetermined rule.

According to the aforementioned configuration, when a user wants to add a game object, for example, the user can exchange game objects through the exchange screen according to the third icon that is not always disposed in addition to purchasing a game object through the purchase screen according to the fourth icon. For example, when the third icon appears, the game system can allow the user to be interested in possessing game objects that can be exchanged at the timing at which the third icon appears or in the area in which the third icon appears.

According to another aspect of the present invention, in the aforementioned game system, the display device causes the second icon C3 to appear and displays the second icon C3 in at least one of the plurality of areas, and the controller provides a game value corresponding to the selected second icon when the second icon is selected, controls whether to cause appearance of the third icon C4 linked to an exchange screen G16 through which a specific game object E151 is selected and can be exchanged according to value in at least one of the plurality of areas on the basis of a predetermined rule, and when the third icon appearing in the area is selected and the game value is exchanged with the specific game object, adds the exchanged game object to possession of the user.

According to the aforementioned configuration, the user can possess the game value by selecting the second icon, for example, and can exchange a specific game object according to the possessed game value. For example, when the first icon has disappeared, the game system can also allow the user to be interested in selecting the second icon and exchanging a specific game object.

According to another aspect of the present invention, in the aforementioned game system, the display device arranges a fifth icon E122 in a specific area, causes the second icon C3 to appear and displays the second icon C3 in at least one of the plurality of areas, and the controller provides a game value corresponding to the selected second icon when the second icon is selected and displays images G17, G17A, G17B and G18 representing games that can be played by consuming the game value on the display device when the fifth icon is selected in the specific area.

According to the aforementioned configuration, a user can possess the game value by selecting the second icon, for example, and determine and play a game that can be played by consuming the possessed game value. For example, when the first icon has disappeared, the game system can also allow the user to be interested in selecting the second icon and playing a game that can be played by consuming the game value.

Another aspect of the present invention is a program for causing a computer to function as the above-described game system 1.

According to another aspect of the present invention, in the aforementioned game system, the controller controls the number of first icons or third icons to be caused to appear with the elapse of time from a predetermined time.

For example, the controller increases the number of first icons or third icons as an elapsed time increases, that is, as time elapses. Here, the controller controls an upper limit value of the number of first icons or third icons. However, the controller may decrease the number of first icons or third icons as the elapsed time increases, that is, as time elapses. Further, the controller may decreases the number of first icons or third icons when a user selects a first icon or a third icon or plays a game corresponding to a first icon or a third icon.

According to another aspect of the present invention, in the aforementioned game system, the controller controls the number of first icons or third icons to be caused to appear to be equal to or less than the upper limit value for all of the plurality of areas or for each combination thereof. Further, in this case, the controller may cause at least one of first icons or third icons to appear in all of the plurality of areas or all areas included in a combination thereof. In this case, the game system can allow a user to visit all areas when the user searches all first icons or third icons, for example. Here, the controller may arrange icons linked to other screens (a shop screen, a trader screen, a battle part selection screen, a rare quest selection screen, etc.) in each area. Accordingly, the game system can provide an opportunity to link to each screen to a user who searches the first icons or third icons.

According to another aspect of the present invention, in the aforementioned game system, the controller limits a total number of first icons or third icons to be caused to appear to the upper limit value or less for each of the areas.

According to another aspect of the present invention, in the aforementioned game system, the controller acquires display information that represents first icons or third icons to be caused to appear, an area in which the first icons or third icons will appear and positions in the area at which the first icons or third icons will appear for each of the first icons or third icons, and the display device causes the first icons or third icons represented by the display information to appear and displays them at the positions in the area represented by the display information. For example, the controller determines the first icons or third icons to be caused to appear. In addition, for each of the determined first icons or third icons, the controller generates display information that represents the area in which the first icons or third icons will appear and positions in the area at which they will appear.

For example, the controller changes the first icons or third icons to be caused to appear, the area in which the first icons or third icons will appear and the positions in the area in accordance with determining them. That is, the game system not only causes the same first icons or third icons to appear each time or causes the first icons or third icons in the same area or positions each time but also dynamically changes the first icons or third icons to be caused to appear or changes the area and the positions in the area at which the first icons or third icons will appear. Accordingly, the game system can allow the user to enjoy searching various first icons or third icons, or searching various areas or various positions.

According to another aspect of the present invention, in the aforementioned game system, the controller controls the number of first icons or third icons to be caused to appear in a first area and the number of first icons or third icons to be caused to appear in a second area, and the display device displays a number of first icons or third icons, which is different from the number of first icons or third icons to be caused to appear in the first area, in the second area. For example, the controller determines the number of first icons or third icons to be caused to appear in the first area and the number of first icons or third icons to be caused to appear in the second area. Here, the controller can determine appearance of a number of first icons or third icons, which is different from the number of first icons or third icons to be caused to appear in the first area, in the second area.

According to another aspect of the present invention, in the aforementioned game system, the controller controls the number of first icons of a first type and the number of first icons of a second type having a different appearance probability from the first type, and the display device displays first icons of the first type and second icons of the second type in different display modes. For example, the display device differently displays a quest selection icon corresponding to a normal quest and a quest selection icon corresponding to a rare quest. The controller determines the number of icons for each quest selection icon type.

According to another aspect of the present invention, in the aforementioned game system, the display device displays images representing characters as the first icons, and the controller causes a battle game for battling with each character represented by a selected image to be playable.

According to another aspect of the present invention, in the aforementioned game system, the display device arranges and displays, in a specific area, a sixth icon E101 linked to a communication battle screen G8 through which communication battle games can be played, and the controller causes at least one first icon or third icon to appear in the area in which the sixth icon is disposed.

According to another aspect of the present invention, in the aforementioned game system, the display device arranges and displays, in a specific area, a fourth icon linked to a purchase screen through which game objects can be purchased, and the controller causes at least one first icon or third icon to appear in the area in which the fourth icon is disposed.

According to another aspect of the present invention, in the aforementioned game system, the display device arranges and displays, in a specific area, a fifth icon linked to a selection screen through which games that can be played by consuming game values are selected, and the controller causes at least one first icon or third icon to appear in the area in which the fifth icon is disposed.

According to another aspect of the present invention, in the aforementioned game system, the display device displays at least two of a first area in which the fourth icon linked to the purchase screen through which game objects can be purchased is disposed, a second area in which the fifth icon linked to the selection screen through which games that can be played by consuming game values is disposed, and the second area in which the third icon linked to the communication battle screen through which communication battle games can be played is disposed. Accordingly, the game system can provide a link to the purchase screen, the selection screen or the communication battle screen in each area to a user who searches the first icons or third icons.

According to another aspect of the present invention, in the aforementioned game system, the controller controls types of first icons C1 and C2 to be caused to appear according to any one or both of the area and time. First icons of different types appear according to area or time. A user can play different types of game by detecting and selecting first icons. For example, the game system 1 can cause the user to be interested in searching first icons of different types according to area or time. According to another aspect of the present invention, in the aforementioned game system, the display device causes second icons C3 of a different type from the first icons C1 and C2 to appear and displays the second icons C3, and the controller limits the number of icons to be caused to appear to an upper limit value or less for each icon type.

According to another aspect of the present invention, in the aforementioned game system, the controller controls the number of types of icons to be caused to appear or the number of icons for each type according to any one or both of the area and time. For example, respective types have different link destinations, and the first icons C1 and C2, second icons C3 and third icons C4 are of different types.

Another aspect of the present invention is a server device including, a display controller which causes at least one icon to appear and displays it in at least one of a plurality of areas, and a controller which controls a game corresponding to a selected first icon such that the game can be played when any one of the first icons is selected in a switched area, wherein the controller limits the number of first icons to be caused to appear to an upper limit value or less.

INDUSTRIAL APPLICABILITY

An aspect of the present invention can be used in game devices, game machines, potable display devices such as cellular phone devices and tablet terminals, head mount displays, server devices, integrated circuits, programs and the like, for example.

REFERENCE SIGNS LIST

1 Game system
10 Terminal device
30 Server device
11 In-terminal communication device
12 In-terminal input device
13 In-terminal display device
14 In-terminal sound reproduction device
15 In-terminal storage device
160 In-terminal controller
161 In-terminal data manager
162 In-terminal game processor
163 In-terminal screen generator
164 In-terminal output controller
31 In-server communication device
32 In-server storage device
321 User data storage device
322 Card data storage device
323 Game state data storage device
330 In-server controller
331 In-server data manager
332 In-server game processor

What is claimed is:

1. A game system, comprising:
one or more hardware processors;
one or more memories that store processor-executable instructions, when executed by the one or more hardware processors, to cause the one or more hardware processors to perform at least:
causing a display device to display one or more game-quest-selection icons respectively in one or more areas of the display, the one or more game-quest-selection icons selected from a plurality of displayable game-quest-selection icons;
receiving an operation for selecting a first game-quest-selection icon, among the one or more game-quest-selection icons displayed in the one or more areas;
controlling a game play of at least one game respectively associated with the selected first game-quest-selection icon;
decreasing a number of the one or more game-quest-selection icons simultaneously displayed in the one or more areas based on the selection of the first game-quest-selection icon;
increasing the number of the one or more game-quest-selection icons simultaneously displayed in the one or more areas based on a time elapsed from the selection of the first game-quest-selection icon;
managing an upper limit, which corresponds to a maximum number of game-quest-selection icons that are simultaneously displayable in the one or more areas; and changing the upper limit based on a current level of a game player.

2. The game system according to claim 1, wherein the processor-executable instructions, when executed by the one or more hardware processors, cause the one or more hardware processors to perform at least:

placing the same number of game-quest-selection icons as the upper limit on the basis of utilization of one or more game objects.

3. The game system according to claim 1, wherein the processor-executable instructions, when executed by the one or more hardware processors, cause the one or more hardware processors to perform at least:

receiving an operation to switch the one or more areas between a displayed state by the display device and a non-displayed state, limiting, to the upper limit, a total number of icons in all of the one or more areas in both the displayed state and the non-displayed state.

4. The game system according to claim 1, wherein the processor-executable instructions, when executed by the one or more hardware processors, cause the one or more hardware processors to perform at least:

causing the display device to display a first icon, a second icon, and a third icon in at least one of the one or more areas;

causing the display device to display an image which represents a game battle opponent of a game which is playable by utilizing the one or more game objects in case that the third icon is selected, and setting at least one of difficulty levels and rewards for games associated with the second icon and for games playable by selecting the third icon, wherein the at least one of difficulty levels and rewards is higher than a difficulty level and a reward of the game associated with the first icon.

5. The game system according to claim 1, wherein the processor-executable instructions, when executed by the one or more hardware processors, cause the one or more hardware processors to perform at least:

causing the display device to display a first set of one or more icons of a first type and a second set of one or more icons of a second type in a first group of areas, and to display a third set of one or more icons of the first type and a fourth set of one or more icons of the second type in a second group of areas, wherein the second set of one or more icons of the second type in the first group of areas is different from the fourth set of one or more icons of the second type in the second group of areas; and setting a difficulty level and a reward for the game associated with the one or more icons of the second type to be higher than a difficulty level and a reward of the game associated with the one or more icons of the first type.

6. The game system according to claim 1, wherein the processor-executable instructions, when executed by the one or more hardware processors, cause the one or more hardware processors to perform at least:

causing the display device to display one or more icons of a first type and one or more icons of a second type in the one or more areas, wherein the number of the one or more icons of the second type is less than the number of the one or more icons of the first type; and setting a difficulty level and a reward for the game associated with the one or more icons of the second type to be higher than a difficulty level and a reward of the game associated with the one or more icons of the first type.

7. The game system according to claim 1, wherein the processor-executable instructions, when executed by the one or more hardware processors, cause the one or more hardware processors to perform at least:

displaying the display device to display an image which represents a game battle opponent of a turn-based battle game, and progressing the turn-based battle game between a player and the game battle opponent.

8. A non-transitory computer readable storage medium that stores computer-executable instructions, when executed by one or more computers, to cause the one or more computers to perform at least:

causing a display device to display at least one of one or more areas on which one or more icons are placed, wherein the one or more icons are game-quest-selection icons;

receiving an operation for selecting at least one icon from icons from the one or more areas;

controlling at least one game to be playable, wherein the at least one game is respectively associated with the at least one icon selected;

decreasing a number of the one or more game-quest-selection icons simultaneously displayed in the one or more areas based on the selection of the first game-quest-selection icon;

increasing the number of the one or more game-quest-selection icons simultaneously displayed in the one or more areas based on a time elapsed from the selection of the first game-quest-selection icon;

managing an upper limit, which corresponds to a maximum number of game-quest-selection icons that are simultaneously displayable in the one or more areas; and changing the upper limit based on a current level of a game player.

9. A method comprising:

causing a display device to display at least one of one or more areas on which one or more icons are placed, wherein the one or more icons are game-quest-selection icons;

receiving an operation for selecting at least one icon from icons from the one or more areas;

controlling at least one game to be playable, wherein the at least one game is respectively associated with the at least one icon selected;

decreasing a number of the one or more game-quest-selection icons simultaneously displayed in the one or more areas based on the selection of the first game-quest-selection icon;

increasing the number of the one or more game-quest-selection icons simultaneously displayed in the one or more areas based on a time elapsed from the selection of the first game-quest-selection icon;

managing an upper limit, which corresponds to a maximum number of game-quest-selection icons that are simultaneously displayable in the one or more areas; and changing the upper limit based on a current level of a game player.

10. A game system, comprising:

one or more hardware processors;

one or more memories that store processor-executable instructions, when executed by the one or more hardware processors, to cause the one or more hardware processors to perform at least:

causing a display device to display one or more game-quest-selection icons respectively in one or more areas of the display, the one or more game-quest-selection icons selected from a plurality of displayable game-quest-selection icons;

receiving an operation for selecting a first game-quest-selection icon, among the one or more game-quest-selection icons displayed in the one or more areas;

controlling a game play of at least one game respectively associated with the selected first game-quest-selection icon;

decreasing a number of the one or more game-quest-selection icons simultaneously displayed in the one or more areas based on the selection of the first game-quest-selection icon;

increasing the number of the one or more game-quest-selection icons simultaneously displayed in the one or more areas based on a time elapsed from the selection of the first game-quest-selection icon;

managing an upper limit, which corresponds to a maximum number of game-quest-selection icons that are simultaneously displayable in the one or more areas; and placing the same number of the one or more game-quest-selection icons as the upper limit based on utilization of one or more game objects.

11. The game system according to claim 10, wherein the processor-executable instructions, when executed by the one or more hardware processors, cause the one or more hardware processors to perform at least:

changing the upper limit on the basis of a current level of a game player.

12. The game system according to claim 10, wherein the processor-executable instructions, when executed by the one or more hardware processors, cause the one or more hardware processors to perform at least:

receiving an operation to switch the one or more areas between a displayed state by the display device and a non-displayed state, limiting, to the upper limit, a total number of icons in all of the one or more areas in both the displayed state and the non-displayed state.

13. The game system according to claim 10, wherein the processor-executable instructions, when executed by the one or more hardware processors, cause the one or more hardware processors to perform at least:

causing the display device to display a first icon, a second icon, and a third icon in at least one of the one or more areas;

causing the display device to display an image which represents a game battle opponent of a game which is playable by utilizing the one or more game objects in case that the third icon is selected, and setting at least one of difficulty levels and rewards for games associated with the second icon and for games playable by selecting the third icon, wherein the at least one of difficulty levels and rewards is higher than a difficulty level and a reward of the game associated with the first icon.

14. The game system according to claim 10, wherein the processor-executable instructions, when executed by the one or more hardware processors, cause the one or more hardware processors to perform at least:

causing the display device to display a first set of one or more icons of a first type and a second set of one or more icons of a second type in a first group of areas, and to display a third set of one or more icons of the first type and a fourth set of one or more icons of the second type in a second group of areas, wherein the second set of one or more icons of the second type in the first group of areas is different from the fourth set of one or more icons of the second type in the second group of areas; and setting a difficulty level and a reward for the game associated with the one or more icons of the second type to be higher than a difficulty level and a reward of the game associated with the one or more icons of the first type.

15. The game system according to claim 10, wherein the processor-executable instructions, when executed by the one or more hardware processors, cause the one or more hardware processors to perform at least:

causing the display device to display one or more icons of a first type and one or more icons of a second type in the one or more areas, wherein the number of the one or more icons of the second type is less than the number of the one or more icons of the first type; and setting a difficulty level and a reward for the game associated with the one or more icons of the second type to be higher than a difficulty level and a reward of the game associated with the one or more icons of the first type.

16. The game system according to claim 10, wherein the processor-executable instructions, when executed by the one or more hardware processors, cause the one or more hardware processors to perform at least:

displaying the display device to display an image which represents a game battle opponent of a turn-based battle game, and progressing the turn-based battle game between a player and the game battle opponent.

17. A non-transitory computer readable storage medium that stores computer-executable instructions, when executed by one or more computers, to cause the one or more computers to perform at least:

causing a display device to display one or more game-quest-selection icons respectively in one or more areas of the display, the one or more game-quest-selection icons selected from a plurality of displayable game-quest-selection icons;

receiving an operation for selecting a first game-quest-selection icon, among the one or more game-quest-selection icons displayed in the one or more areas;

controlling a game play of at least one game respectively associated with the selected first game-quest-selection icon;

decreasing a number of the one or more game-quest-selection icons simultaneously displayed in the one or more areas based on the selection of the first game-quest-selection icon;

increasing the number of the one or more game-quest-selection icons simultaneously displayed in the one or more areas based on a time elapsed from the selection of the first game-quest-selection icon;

managing an upper limit, which corresponds to a maximum number of game-quest-selection icons that are simultaneously displayable in the one or more areas; and placing the same number of the one or more game-quest-selection icons as the upper limit based on utilization of one or more game objects.

18. A method comprising:

causing a display device to display one or more game-quest-selection icons respectively in one or more areas of the display, the one or more game-quest-selection icons selected from a plurality of displayable game-quest-selection icons;

receiving an operation for selecting a first game-quest-selection icon, among the one or more game-quest-selection icons displayed in the one or more areas;

controlling a game play of at least one game respectively associated with the selected first game-quest-selection icon;

decreasing a number of the one or more game-quest-selection icons simultaneously displayed in the one or more areas based on the selection of the first game-quest-selection icon;

increasing the number of the one or more game-quest-selection icons simultaneously displayed in the one or more areas based on a time elapsed from the selection of the first game-quest-selection icon;

managing an upper limit, which corresponds to a maximum number of game-quest-selection icons that are simultaneously displayable in the one or more areas; and placing the same number of the one or more game-quest-selection icons as the upper limit based on utilization of one or more game objects.

19. The game system according to claim 1, wherein the one or more game-quest-selection icons corresponding to a quest, which is a game target associated with one or more target achievement conditions.

* * * * *